(12) United States Patent
Shiomi et al.

(10) Patent No.: US 6,717,907 B2
(45) Date of Patent: *Apr. 6, 2004

(54) DISC CARTRIDGE

(75) Inventors: Tetsuhiro Shiomi, Kanagawa (JP);
Takuya Niitsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/228,568

(22) Filed: Aug. 27, 2002

(65) Prior Publication Data

US 2003/0058784 A1 Mar. 27, 2003

Related U.S. Application Data

(63) Continuation of application No. 09/350,333, filed on Jul. 9, 1999, now Pat. No. 6,459,677.

(51) Int. Cl.⁷ .............................................. G11B 23/03
(52) U.S. Cl. ....................................... 369/291; 360/133
(58) Field of Search ........................ 369/291; 360/133; 206/308.1

(56) References Cited

U.S. PATENT DOCUMENTS

| | | |
|---|---|---|
| 4,471,397 A | 9/1984 | Cloutier |
| 4,497,009 A | 1/1985 | Oishi et al. |
| 4,525,758 A | 6/1985 | Nakagawa et al. |

(List continued on next page.)

FOREIGN PATENT DOCUMENTS

| | | |
|---|---|---|
| EP | 0 042 062 A1 | 12/1981 |
| GB | 2228818 A | 9/1990 |
| JP | 10-334630 | 12/1998 |
| JP | 11-110945 | 4/1999 |
| JP | 11-345475 | 12/1999 |

OTHER PUBLICATIONS

Patent Abstracts of Japan, vol. 014, No. 569, Dec. 18, 1990, JP 02 244473.
Patent Abstracts of Japan, vol. 012, No. 102, Apr. 5, 1998, JP 62 234282.
Patent Abstracts of Japan, vol. 011, No. 137, May 2, 1987, JP 61 276187.

*Primary Examiner*—William Klimowicz
(74) *Attorney, Agent, or Firm*—Frommer Lawrence & Haug LLP; William S. Frommer; Matthew K. Ryan

(57) ABSTRACT

A main cartridge body portion is formed with first and second openings facing first and second wall sections. These first and second openings are adapted for exposing a portion of the signal recording region of a disc-shaped recording medium to outside across inner and outer rims of the disc-shaped recording medium and for allowing the center of the disc-shaped recording medium to face outwards. First and second shutter members are arranged for movement between the first and second wall sections. The second shutter member is rotated in association with the first shutter member by having its portion engaged and held by an engagement holding portion provided on the first shutter member.

11 Claims, 13 Drawing Sheets

U.S. PATENT DOCUMENTS

| | | | |
|---|---|---|---|
| 4,550,354 A | 10/1985 | Wakabayashi et al. | |
| 4,646,192 A | 2/1987 | Droux et al. | |
| 4,724,962 A | 2/1988 | Watanabe et al. | |
| 4,780,784 A | 10/1988 | Covington | |
| 5,051,857 A | * 9/1991 | Akiyama | 360/133 |
| 5,063,558 A | * 11/1991 | Takahashi | 369/291 |
| 5,153,801 A | 10/1992 | Ikebe et al. | |
| 5,247,416 A | 9/1993 | Shiba et al. | |
| 5,260,931 A | 11/1993 | Sasaki et al. | |
| 5,278,717 A | 1/1994 | Sasaki et al. | |
| 5,570,252 A | 10/1996 | Sumner et al. | |
| 5,570,342 A | 10/1996 | Kosaka | |
| 5,724,217 A | * 3/1998 | Oishi | 360/133 |
| 5,930,090 A | 7/1999 | Schick et al. | |
| 5,995,346 A | 11/1999 | Schick et al. | |
| 6,021,029 A | 2/2000 | Mamiya et al. | |
| 6,021,031 A | 2/2000 | Hales et al. | |
| 6,023,398 A | 2/2000 | Tannert et al. | |
| 6,111,726 A | 8/2000 | Clark et al. | |
| 6,178,067 B1 | 1/2001 | Schick et al. | |
| 6,356,527 B1 | 3/2002 | Shiomi et al. | |
| 6,459,677 B1 | * 10/2002 | Shiomi et al. | 369/291 |
| 6,473,392 B2 | * 10/2002 | Shiomi et al. | 369/291 |
| 2002/0131361 A1 | * 9/2002 | Oishi et al. | 369/291 |

* cited by examiner

DISC CARTRIDGE

This application is a continuation of U.S. patent application Ser. No. 09/350,333, filed Jul. 9, 1999, now U.S. Pat. No. 6,459,677.

BACKGROUND OF THE INVENTION

1. Field of the Invention

This invention relates to a disc cartridge for housing a disc-shaped recording medium, such as an optical disc or a magneto-optical disc, loaded on a recording and/or reproducing apparatus. More particularly, it relates to a disc cartridge in which a shutter mechanism adapted for opening or closing an aperture formed in a main cartridge body unit is made up of two shutter members adapted for being moved along the major surface of the main cartridge body unit.

2. Description of the Related Art

There has hitherto been used a disc cartridge housing an optical disc, a magneto-optical disc or a magnetic disc and which is loaded therewith on a recording and/or reproducing apparatus.

As this type of the disc cartridge, there is known such a device described in the U.S. Pat. Nos. 4,510,546 and 4,876,619.

With the disc cartridge described in these publications, a disc as a recording medium is rotationally housed within a main cartridge body unit which is rectangular in shape. The main cartridge body unit has a recording and/or reproducing opening for allowing a portion of the housed magnetic disc to be exposed to outside across the inner and outer rims of the disc. This main cartridge body unit carries a shutter member, rectangular in cross-section, adapted to be moved along the front side of the main cartridge body unit for opening/closing the recording and/or reproducing opening.

With the disc cartridge, carrying the shutter member for opening/closing the opening formed in the main cartridge body unit, the opening is perpetually kept closed by the shutter member to prevent affixture of a fingerprint of a user inadvertently touching the recording surface of the disc or to prevent intrusion of dust and dirt via the opening to assure reliable disc protection.

As a disc cartridge housing a disc as an information recording medium, there is known such a one as described in the U.S. Pat. No. 4,614,990.

In the disc cartridge described in this Publication, a shutter member is provided in parallel with the inserting direction of the disc cartridge into the recording and/or reproducing apparatus, so that, on insertion of the disc cartridge into the recording and/or reproducing apparatus, the shutter member is locked or unlocked by an unlock mechanism provided on the recording and/or reproducing apparatus, at the same time as the shutter member is moved in a direction of opening the opening, with the result that the shutter member can be opened or closed by a simplified mechanism.

As a disc cartridge housing a disc as an information recording medium, there is known such one as disclosed in the U.S. Pat. No. 5,570,252. The disc cartridge disclosed in this Publication has an opening in a lateral surface of the main cartridge body unit. The magnetic head is introduced via this opening into the inside of the disc cartridge into sliding contact with the signal recording region of the magnetic disc. In this disc cartridge, the shutter member adapted for opening/closing the opening is mounted for performing movement along a lateral side of the main cartridge body unit.

Meanwhile, with the disc cartridge disclosed in the U.S. Pat. Nos. 4,510,546 and 4,876,619, in which the shutter member is moved along the outer surface of the main cartridge body unit, dust and dirt tend to become affixed to the surface of main cartridge body unit along which slides the shutter member. The dust and dirt, thus deposited, tend to drop into the inside of the main cartridge body unit with movement of the shutter member, thus contaminating the disc housed in the main cartridge body unit.

Also, since the shutter member is moved in a direction perpendicular to the inserting direction of the disc cartridge into the recording and/or reproducing apparatus, it is necessary to provide a complex opening/closing mechanism, such as a rotary arm, thus complicating the mechanism of the recording and/or reproducing apparatus.

Similarly, with the disc cartridge disclosed in the U.S. Pat. No. 4,614,990, in which the shutter member is moved along the outer side of the main cartridge body unit, dust and dirt tend to become affixed to the surface of the main cartridge body unit along which the shutter member is moved, so that the dust and dirt tend to drop into the inside of the main cartridge body unit to contaminate the disc housed in the main cartridge body unit.

In the disc cartridge disclosed in the U.S. Pat. No. 5,570,252, in which the magnetic head is inserted into the inside of the main cartridge body unit via the narrow opening provided in the lateral side of the main cartridge body unit, there are imposed limitations on the recording and/or reproducing mechanism used. Such disc cartridge is extremely difficult to apply to an optical disc used in an optical pickup device. Moreover, the shutter member is configured for opening/closing the opening which is narrow in width and longer in length than in width, the shutter member is also narrow in width and longer in length to render it difficult to realize stable movement of the shutter member.

SUMMARY OF THE INVENTION

It is therefore an object of the present invention to provide a disc cartridge in which it is possible to prevent dust and dirt deposited on the outer surface of the main cartridge body unit in association with movement of the shutter member from being intruded into the inside of the main cartridge body unit to assure reliable protection of the disc-shaped recording medium housed in the main cartridge body unit.

It is another object of the present invention to provide a disc cartridge having a shutter mechanism including a recording and/or reproducing opening larger in size than the main cartridge body unit housing the disc-shaped recording medium to enable use of the large-sized recording and/or reproducing mechanism to permit the large-sized opening to be opened or closed reliably.

It is still another object of the present invention to provide a disc cartridge that is able to close the opening in the main cartridge body unit reliably to protect the disc-shaped recording medium housed in the main cartridge body unit reliably.

It is yet another object of the present invention to provide a disc cartridge reduced in thickness and a recording and/or reproducing apparatus employing the disc cartridge and which is also reduced in thickness.

A disc cartridge according to the present invention is such a disc cartridge housing a disc-shaped recording medium such as an optical disc or a magneto-optical disc and which is loaded along with the disc-shaped recording medium on the recording and/or reproducing apparatus. A shutter mechanism for opening/closing an opening provided in the main cartridge body unit includes two shutter members movable along the major surface of the main cartridge body unit. An area in which are moved the first shutter member and the second shutter member of the main cartridge body unit is constituted by first and two wall sections arranged facing each other. The first and second shutter members are intruded into a spacing defined between the first and two wall sections.

The disc cartridge includes a main cartridge body unit and first and second shutter members. The main cartridge body unit rotatably houses the disc-shaped recording medium, and includes first and second wall sections facing the portion of the disc cartridge in turn facing the major surface of the disc-shaped recording medium at a pre-set separation from each other. The main cartridge body unit also includes a recording and/or reproducing opening facing the first and second wall section for exposing a portion of the signal recording region of the disc-shaped recording medium to outside and a driving opening adapted to allow the center of the disc-shaped recording medium to be exposed to outside. The first and second shutter members include first and second shutter members adapted for opening/closing the recording and/or reproducing opening and the driving opening. The first and second shutter members are adapted to be moved between the first and second wall sections.

The first shutter member is supported so that its one end will be moved along the position proximate to the outer rim of the circular medium housing section formed on the main cartridge body unit for rotationally housing the disc-shaped recording medium. The second shutter member is supported by the main cartridge body unit in association with the rotation of the first shutter member by having its portion engaged and held by the engagement holding portion provided on the first shutter member.

Another disc cartridge according to the present invention is such a disc cartridge rotationally housing a disc-shaped recording medium in a main cartridge body unit made up of an upper half cartridge and a lower half cartridge abutted and connected to each other. The disc cartridge includes a recording and/or reproducing opening provided in the main cartridge body unit for exposing a signal recording region of the disc-shaped recording medium at least across the inner and outer rims of the disc-shaped recording medium, a driving opening for entrance of the rotating driving means for the disc-shaped recording medium and a shutter mechanism for opening/closing the driving opening. The shutter mechanism provided on the disc cartridge includes a first shutter member for opening/closing mainly the recording and/or reproducing opening and a second shutter member for opening/closing mainly the driving opening. The first shutter member includes a shutter portion for opening/closing the recording and/or reproducing opening and the driving opening, a movement causing portion for causing movement of the shutter portion and a connecting portion interconnecting the shutter and movement causing portions. The movement causing portion is moved along a lateral surface of the disc cartridge to move the shutter portion to open/close the respective openings.

The disc cartridge according to the present invention also includes a main cartridge body unit and a shutter member. The main cartridge body unit has a recording medium housing section for housing the disc-shaped recording medium therein, a first wall section constituting the bottom wall of the medium housing section, a second wall section arranged facing the first wall section, a second opening formed in the second wall section for facing the first opening formed in the first wall section, a cut-out formed in the peripheral wall of the recording medium housing section and a groove formed in continuation to the cut-out. The shutter member includes a shutter portion arranged between the first and second wall sections for opening/closing an opening comprised of the first and second openings and a cut-out opening/closing portion arranged in adjacency to the shutter portion for extending from the cut-out to the groove for opening/closing the cut-out. The cut-out opening/closing portion is stepped in shape.

Other objects and advantages of the present invention will become apparent from the following detailed description of the preferred embodiments and the claims.

DESCRIPTION OF THE PREFERRED EMBODIMENTS

Figure 1:
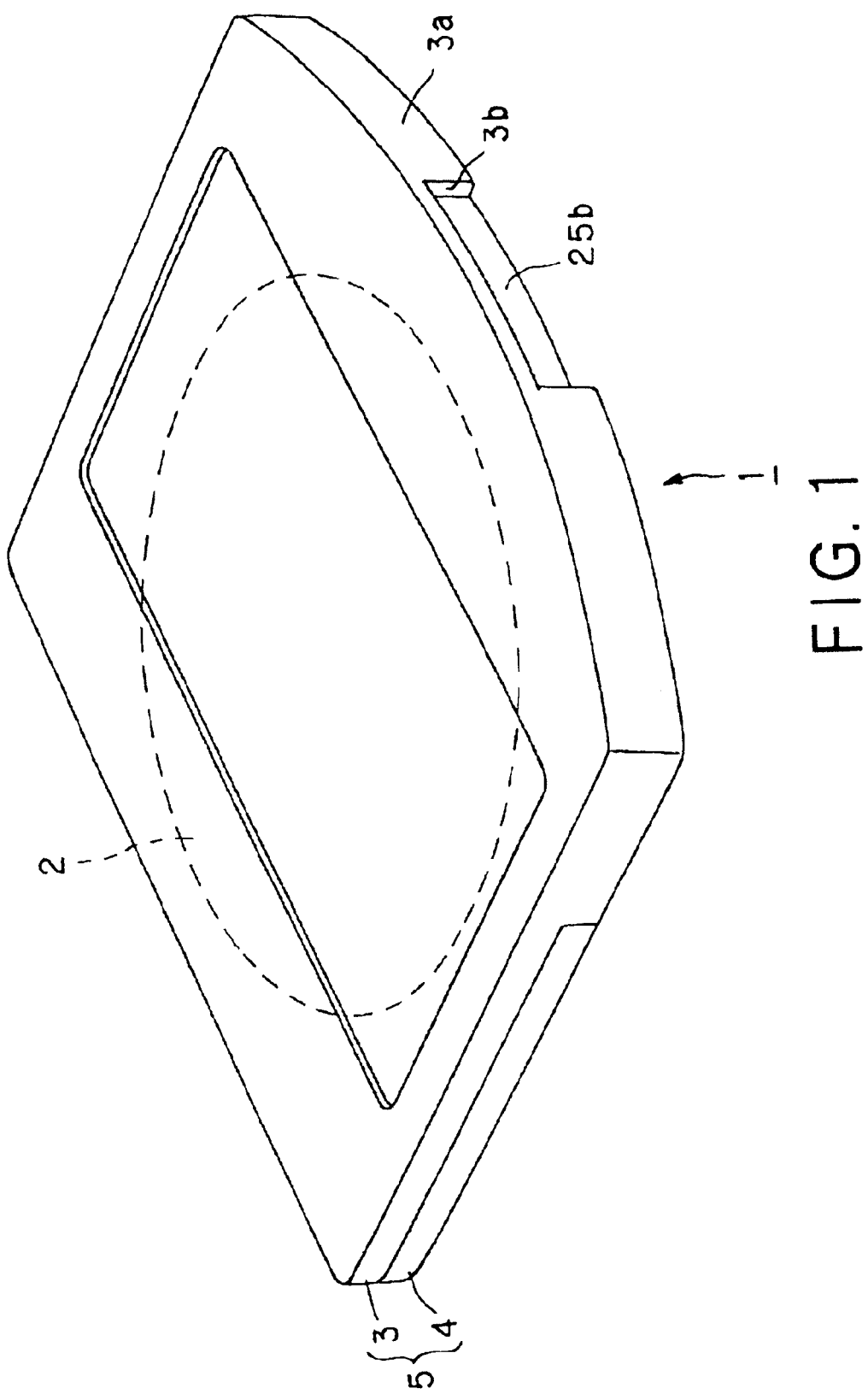
FIG. 1 is a perspective view showing a disc cartridge according to the present invention.

Referring to the drawings, a disc cartridge of the present invention will be explained in detail.

Figure 2:
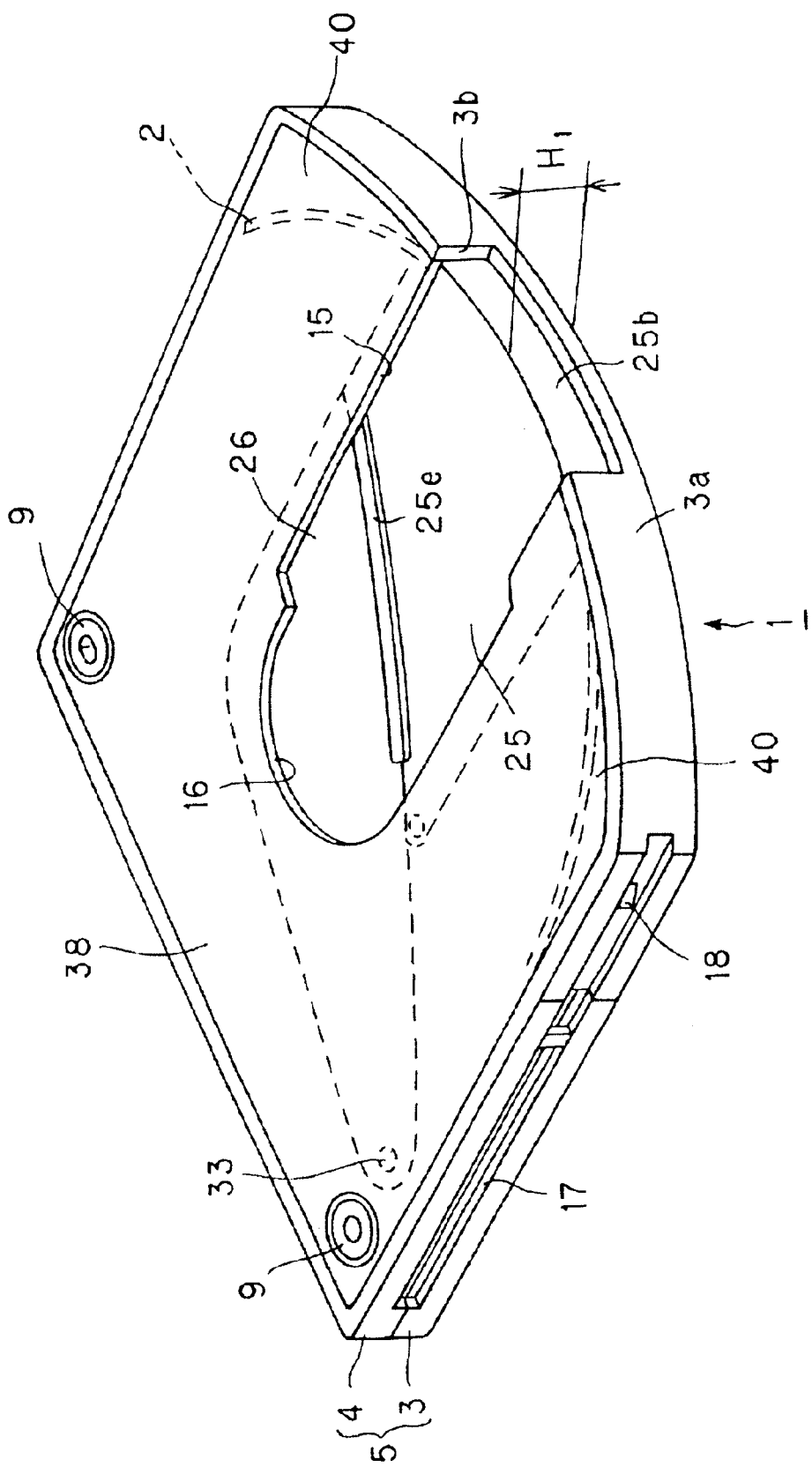
FIG. 2 is a perspective view of a disc cartridge according to the present invention looking from the bottom side provided with a shutter mechanism and showing both a recording and/or reproducing opening and a driving opening closed by the shutter mechanism.

A disc cartridge 1 of the present invention houses an optical disc 2 of a recordable type for re-recording the information, such as the audio or video information, using a disc-shaped recording medium, or houses a replay-only optical disc 2 having the pre-recorded audio or video information. The disc cartridge 1 rotationally houses an optical disc 2 in a main cartridge body unit 5 constituted by an upper half cartridge 3 and a lower half cartridge 4, as shown in FIGS. 1 and 2.

The optical disc 2, housed in the main cartridge body unit 5, has a center opening 6, and a hub 7, formed by a plate of a magnetic material, such as metal, for closing the center opening 6. The optical disc 2 is set on a disc table of a rotational driving mechanism of the recording and/or reproducing apparatus, and has the hub 7 attracted by a magnet provided on the disc table, so that the optical disc 2 will be rotated in unison with the disc table. When the optical disc 2 is loaded on the disc table, a centering portion provided at the center of the disc table is engaged with the center opening 6 to achieve centering so that the center of rotation of the optical disc 2 will be coincident with the center of rotation of the disc table.

Figure 3:
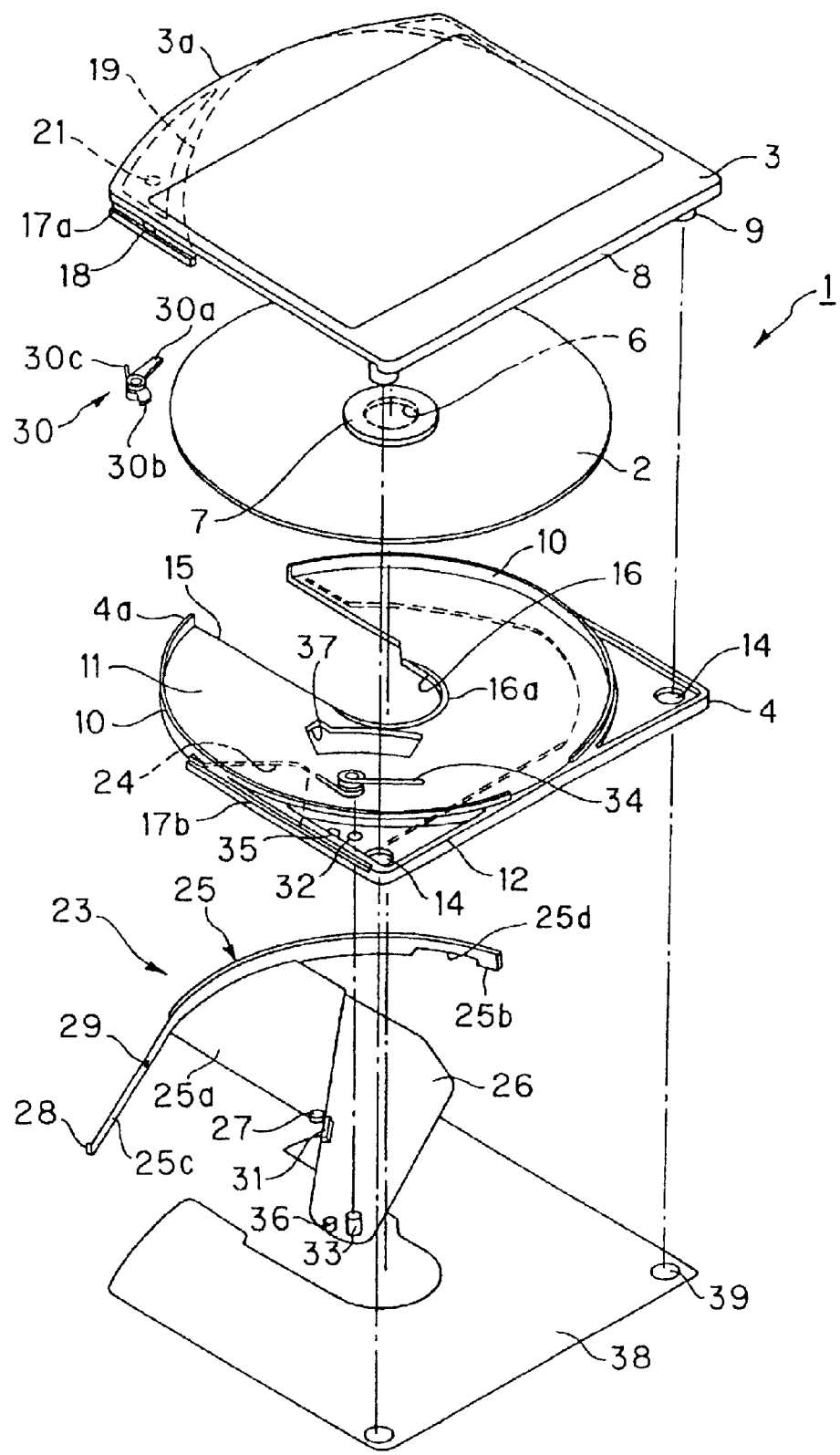
FIG. 3 is an exploded perspective view of the disc cartridge.

The main cartridge body unit 5, rotationally housing the optical disc 2, is combined from an upper half cartridge 3 and a lower half cartridge 4 abutted and connected to each other, as shown in FIG. 3. The upper half cartridge 3 and the lower half cartridge 4 are substantially rectangular in shape and molded from synthetic resin, as shown in FIG. 3.

The upper half cartridge 3, constituting the main cartridge body unit 5, has an upstanding peripheral wall 8 constituting an peripheral wall of the main cartridge body unit 5. The upper half cartridge 3 has a front surface 3a, as an inserting end of the upper half cartridge 3 into the recording and/or reproducing apparatus, presents a continuous arcuate surface. The arcuate front surface 3a has a mid cut-out 3b into which is intruded a recording/reproducing mechanism provided on the recording and/or reproducing apparatus. The front surface of the upper half cartridge 3 also operates as a front surface of the main cartridge body unit 5. The opposite lateral surfaces of the main cartridge body unit 3 perpendicular to the front surface 3a of the upper half cartridge 3 operating as the inserting end into the recording and/or reproducing apparatus are formed as flat surfaces to permit the inserting end into the recording and/or reproducing apparatus to be recognized as such. The disc cartridge can also be distinguished from the rectangular disc cartridge widely recognized as the disc cartridge.

Referring to FIGS. 1 and 2, only the front surface 3a of the upper half cartridge 3 constituting the front surface of the main cartridge body unit 5 is formed as an arcuate surface, while the lateral surfaces thereof perpendicular to the front surface 3a are linear flat surfaces parallel to each other, so that these lateral surfacers act as inserting guide surfaces at the time of insertion and detachment with respect to the recording and/or reproducing apparatus to realize stable lateral surfaces of the recording and/or reproducing apparatus.

The back surface of the main cartridge body unit 5 opposite to the arcuate front surface 3a may also be arcuately shaped. In this case, the arc of the back surface is preferably larger than the arc of the front surface 3a to permit distinction from the front side of the disc cartridge 1.

With the disc cartridge 1, since only the front surface 3a of which operating as an inserting end into the recording and/or reproducing apparatus, is designed as an arcuate surface, the disc cartridge 1 can be reduced in plan size as compared to the optical disc 2 housed therein to permit reduction in size of the recording and/or reproducing apparatus employing the disc cartridge 1.

Referring to FIGS. 2 and 3, the corners on the back side opposite to the arcuately-shaped front surface 3a of the upper half cartridge 3 are formed with tubular positioning portions 9 engaged by positioning pins on the recording and/or reproducing apparatus. Each of the positioning portions 9 has its distal end opened and has its proximal end closed by the upper half cartridge 3.

The lower half cartridge 4, abutted against the upper half cartridge 3 to constitute the main cartridge body unit 5, is arcuate with a curvature larger than that of the front surface 3a of the upper half cartridge 3. That is, an arcuate front surface 4a of the lower half cartridge 4 is arcuate with a radius smaller than that of the front surface 3a of the upper half cartridge 3, as shown in FIG. 3. The portions of the lower half cartridge 4 other than the front surface 4a are shaped similarly to the upper half cartridge 3. That is, the opposite lateral sides perpendicular to the front surface 4a of the lower half cartridge 4 are parallel to each other, with the back surface opposite to the front surface 4a of the lower half cartridge 4 being formed as planar surfaces.

On the inner major surface of the lower half cartridge 4 is formed upright an arcuate housing section forming wall 10 constituting a circular disc housing section 11. This housing section forming wall 10 has the same radius of curvature as that of the front surface 4a. On the outer perimeter of the lower half cartridge 4 is formed an upstanding peripheral wall 12 abutted against the upstanding peripheral wall 8 constituting the peripheral wall of the main cartridge body unit 5 formed upright on the outer rim of the upper half cartridge 3. In substantially triangular regions of the back surface side of the lower half cartridge 4 surrounded by the upstanding peripheral wall 12 and the housing section forming wall 10, there are formed holes 14 into which are fitted the positioning portions 9 provided on the upper half cartridge 3.

Referring to FIGS. 2 and 3, the lower half cartridge 4 is formed with a recording and/or reproducing opening 15 and a driving opening 16. The recording and/or reproducing opening 15 is adapted for exposing a portion of the signal recording region of the optical disc 2 housed in the disc housing section 11 to outside across the inner and outer rings of the disc, and for facing recording and/or reproducing means, such as an optical pickup device, while the driving opening 16 is adapted to permit entrance of the turntable of the rotational driving mechanism provided on the recording and/or reproducing apparatus. In the present disc cartridge 1, the recording and/or reproducing opening 15 is formed in continuation with the driving opening 16.

Although the recording and/or reproducing opening 15 may be provided independently of the driving opening 16, there is then provided a partitioning connection portion between the openings 15, 16. If the connecting portion is provided in this manner, it becomes impossible to shift the recording and/or reproducing mechanism, such as the optical pickup device, adapted to scan the signal recording region of the optical disc 2, such that sufficient recording capacity of the optical disc 2 cannot be achieved. Therefore, the recording and/or reproducing opening 15 preferably is formed as one with the driving opening 16.

Referring to FIG. 3, the recording and/or reproducing opening 15 is formed substantially as a rectangular opening extending from the vicinity of the mid portion of the disc housing section 11 up to the front surface 4a of the lower half cartridge 4. This opening 15, continuing to the driving opening 16, is formed by opening the front surface 4a of the lower half cartridge 4. The driving opening 16 is substantially circular and is positioned at a mid portion of the disc housing section 11. On the periphery of the inner rim of the driving opening 16 is formed a disc supporting portion 16a supporting the rim of the center opening 6 of the optical disc 2 housed in the disc housing section 11.

Figure 4:
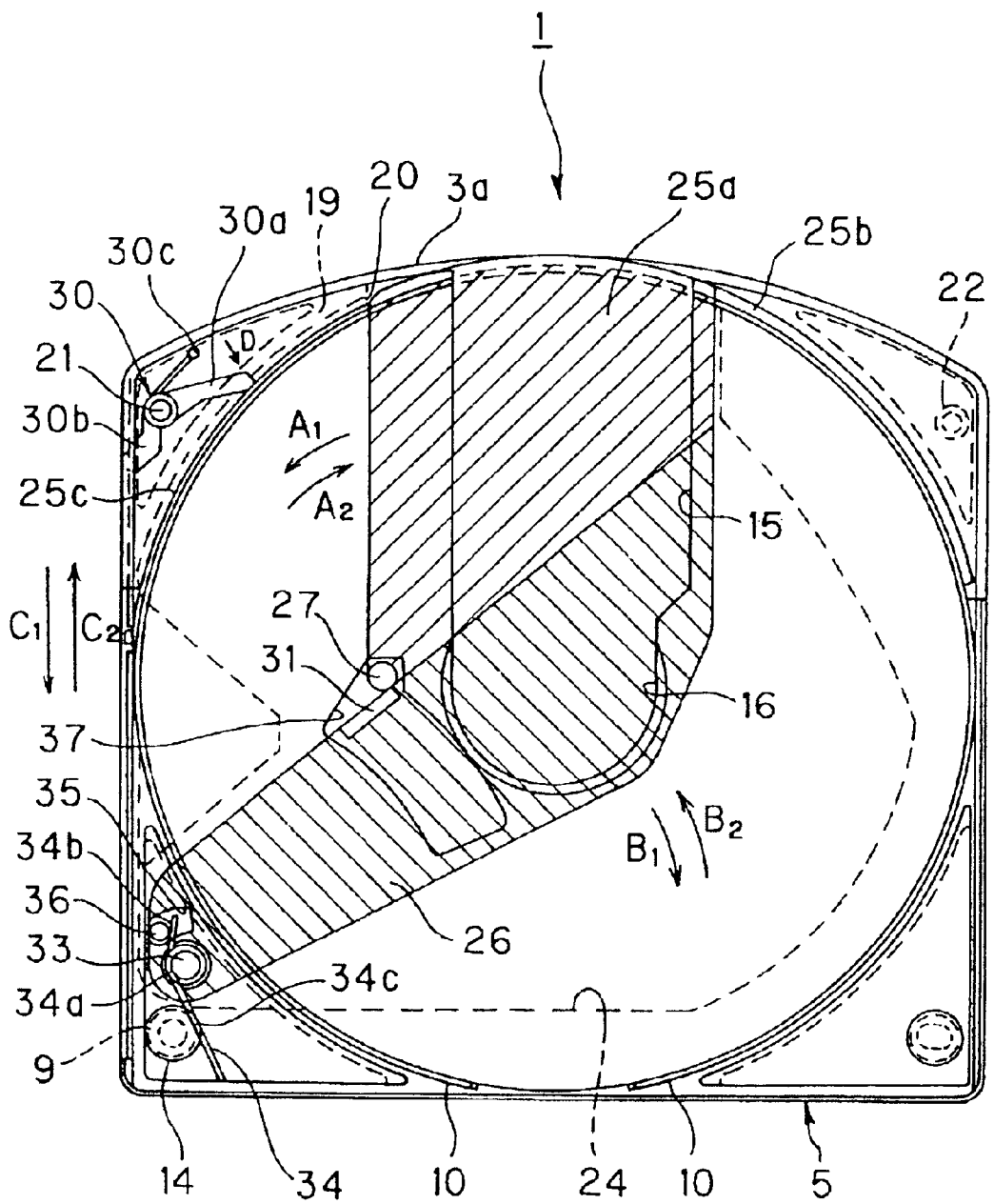
FIG. 4 is a plan view of the disc cartridge showing the state of closure of the recording and/or reproducing opening and the driving opening.

In the main cartridge body unit 5, since the front surface 4a of the lower half cartridge 4 has a curvature larger than the curvature of the front surface 3a of the upper half cartridge 3, the corners of the front surface of the upper half cartridge 3 are protruded from the corners on the upper half cartridge 3 when the upper and lower half cartridges 3, 4 are abutted against each other, as shown in FIG. 4. The upstanding peripheral wall 8, formed on the portion of the upper half cartridge 3 protruded from the lower half cartridge 4, is formed to a height corresponding to the thickness of the main cartridge body unit 5.

In a lateral surface perpendicular to the front surface of the main cartridge body unit 5 is formed an engagement groove 17 for a shutter opening/closing member, as shown in FIG. 2. When the upper and lower half cartridges 3,4 are abutted against each other, the engagement groove 17 for a shutter opening/closing member is abutted against a groove 17a formed in the upstanding peripheral wall 8 of the upper half cartridge 3 and against a recess 17b formed in the upstanding peripheral wall 12. When the disc cartridge 1 is inserted into the recording and/or reproducing apparatus, a shutter opening/closing member constituting the shutter opening/closing mechanism provided on the recording and/or reproducing apparatus is engaged in the engagement groove 17 for a shutter opening/closing member for movement therein. The engagement groove 17 for a shutter opening/closing member is formed with a through-hole 18 into which is protruded part of a lock member 30 as later explained.

Figure 5:
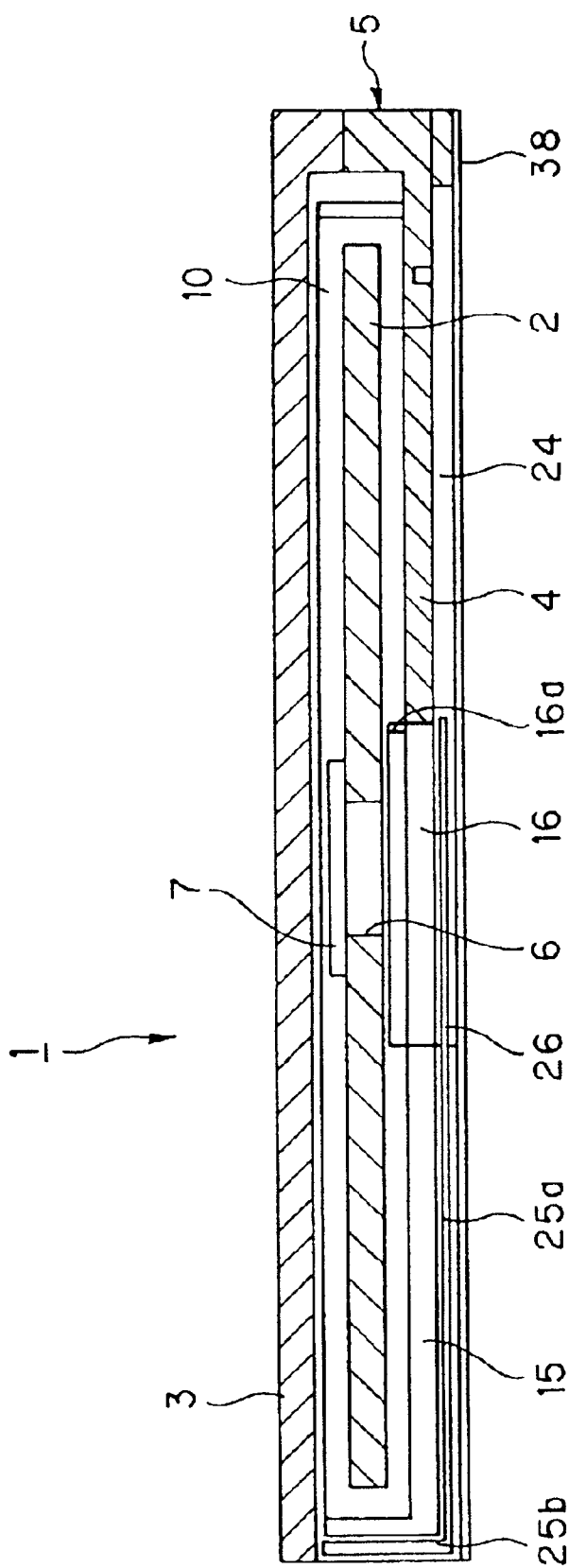
FIG. 5 is a transverse cross-sectional view of the disc cartridge.

The front surface 3a of the upper half cartridge 3 constituting the main cartridge body unit 5 is formed with an inner wall 19 having the same curvature as that of the front surface 4a of the lower half cartridge 4. When the upper and lower half cartridges 3, 4 are abutted against each other, as shown in FIGS. 4 and 5, the inner wall section 19 is abutted against the inner surface of the lower half cartridge 4 along the outer periphery of the arcuate housing section forming wall 10 provided on the lower half cartridge 4. In the inner wall section 19 of the upper half cartridge 3 and in the peripheral wall 10 of the lower half cartridge 4 is formed a shutter guide groove 20 for guiding the opening/closure movement of a first shutter member 25 of the shutter mechanism 23, as shown in FIGS. 4 and 5.

At both corners towards the front surface of the main cartridge body unit 5 are formed a pair of substantially triangular regions surrounded by the upstanding peripheral wall 8 and the inner wall section 19 of the upper half cartridge 3, as shown in FIG. 4. In a region of the main cartridge body unit 5 provided with the engagement groove 17 for a shutter opening/closing member provided in the main cartridge body unit 5, there is protruded a supporting shaft 21 for rotationally supporting a lock member 30, as shown in FIG. 4. In the opposite side similar region, there is provided a cover member supporting protrusion 22 for supporting a cover member 38.

In the bottom surface of the lower half cartridge 4 constituting the main cartridge body unit 5, there is provided a recessed shutter mounting portion 24 in which to mount the shutter mechanism 23 adapted for opening/closing the recording and/or reproducing opening 15 and the driving opening 16, as shown in FIGS. 4 and 5. The shutter mounting portion 24 is formed over an extent through which is slid the shutter mechanism 23 for opening/closing the recording and/or reproducing opening 15 and the driving opening 16.

The shutter mechanism 23 arranged on the shutter mounting portion 24 is made up of a first shutter member 25 for opening/closing the recording and/or reproducing opening 15 and a second shutter member 26 for opening/closing the driving opening 16. The first shutter member 25 and the second shutter member 26 are arranged in a co-planar relation in the shutter mounting portion 24. The shutter mechanism 23 may also be so designed that the first shutter member 25 mainly opens/closes the recording and/or reproducing opening 15, while the second shutter member 26 mainly opens/closes the driving opening 16. That is, the first shutter member 25 may, for example, be designed so that the second shutter member 26 is moved to affect a portion of the opening to be opened/closed by the other shutter member to open/close the recording and/or reproducing opening 15 and the driving opening 16.

The first shutter member 25 is formed of synthetic resin or metal and is made up of a shutter portion 25a, formed as a flat plate, a movement guide portion 25b formed upright on a side of the shutter portion 25a, and an actuating portion 25c protruded from one end of the movement guide portion 25b, as shown in FIG. 3. The first shutter member 25 is mounted on the main cartridge body unit 5, with the shutter portion 25a being positioned in the shutter mounting portion 24 formed in the lower half cartridge 4 and with the movement guide portion 25b and the actuating portion 25c being positioned in the shutter guide groove 20. The shutter portion 25a is formed as substantially trapezoidal shape of a size sufficient to close the recording and/or reproducing opening 15, and carries on its lateral side an arcuate portion of the same curvature as that of the front surface 4a of the lower half cartridge 4. This shutter portion 25a is rotated in the direction indicated by arrows A1 and A2 in FIG. 4, with the center of the disc housing section 11 as virtual center, for opening/closing the recording and/or reproducing opening 15.

The shutter portion 25a has a side edge opposite to its arcuate portion abutted against the second shutter member 26. The shutter portion 25a has an overlapping portion 25e on a side edge abutted against the second shutter member 26. This overlapping portion 25e is overlapped with a side of the second shutter member 26. This overlapping portion 25e may also be provided on the second shutter member 26. The shutter portion 25a is provided with a shaft-shaped guide protrusion 27 on its major surface, that is on a surface opposite to the shutter mounting portion 24. The shaft-shaped guide protrusion 27 regulates the movement position of the shutter portion 25a. This shaft-shaped guide protrusion 27 is provided on the side of the shutter portion 25a abutted against the second shutter member 26. The shaft-shaped guide protrusion 27 holds a certain thickness in a portion of the shutter portion 25a to prevent the first shutter member 25 and the second shutter member 26 from being shifted into an overlapping relation with each other at the time of the opening/closure operation.

The movement guide portion 25b is formed subsequently upright with respect to the shutter portion 25a for extending along an arcuate portion formed on one side of the shutter portion 25a. This movement guide portion 25b is formed in an arcuate shape of the same curvature as that of the shutter guide groove 20 and is arranged for movement therein in the direction indicated by arrows A1 and A2 in FIG. 4. The movement guide portion 25b is of a length longer than that of the arcuate portion of the shutter portion 25a so as to reach the vicinity of an end of a shutter guide groove 20 to control the movement so that the first shutter member 25 will not be moved in excess of a pre-set distance in the direction indicated by arrow A2 in FIG. 4. The movement guide portion 25b is provided with a recess 25d into which is intruded the recording/reproducing mechanism, such as an optical pickup, when the shutter mechanism 23 is opened.

Figure 8:
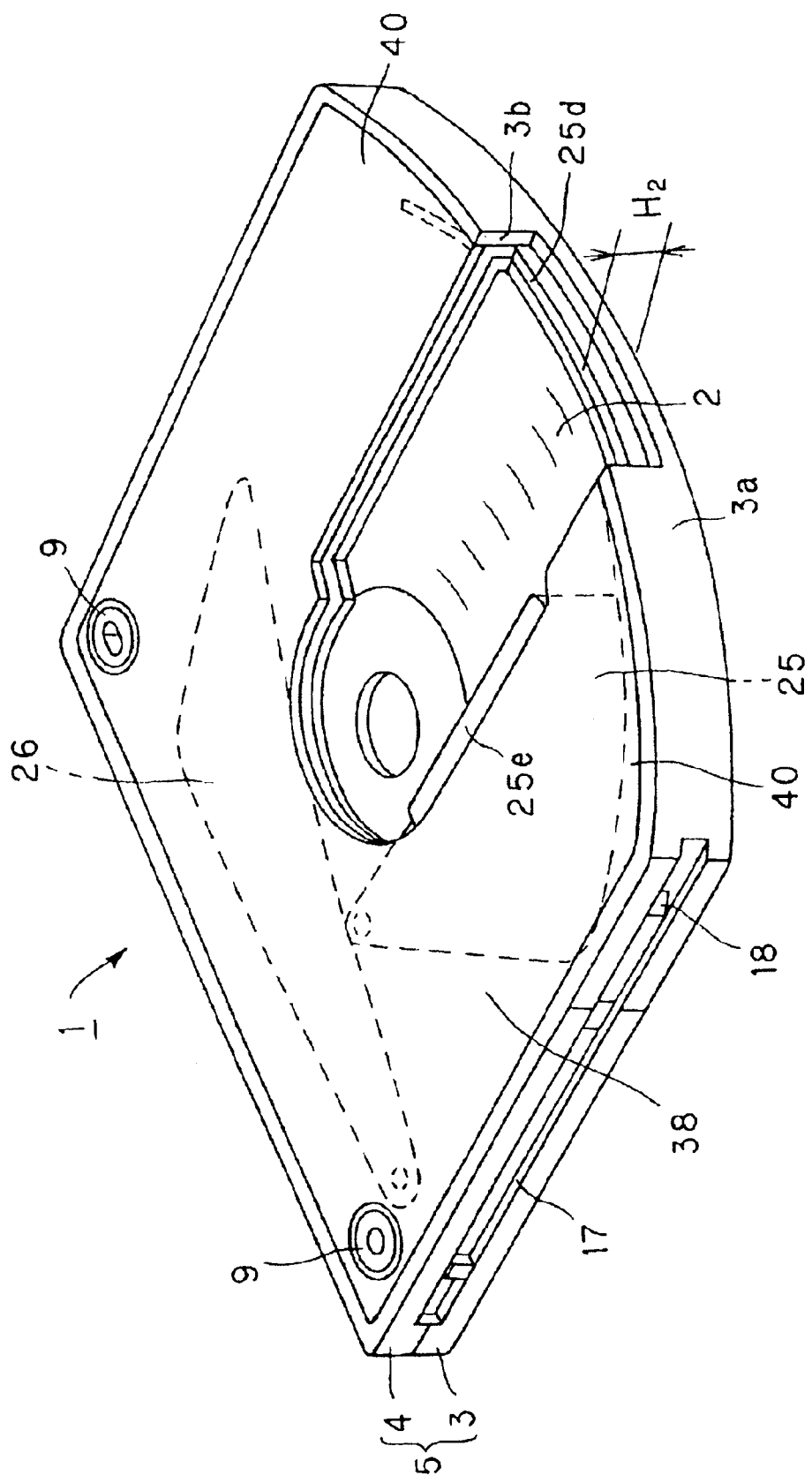
FIG. 8 is a perspective view of the disc cartridge showing the recording and/or reproducing opening and the driving opening in the opened state.

In the closure position of the shutter mechanism 23, the movement guide portion 25b closes the cut-out 3b formed in the front side of the main cartridge body unit 5, as shown in FIG. 1. When the shutter mechanism 23 is opened, as shown in FIG. 8, the recess 25d is moved to the cut-out 3b to create an opening in the front side which will permit the optical disc 2 to be exposed to outside, as shown in FIG. 8. That is, the disc cartridge 1 is constructed so that the height H2 in the opened state of the shutter mechanism 23 as shown in FIG. 8 will be lower than the height H1 in the closed state of the shutter mechanism 23, as shown in FIG. 2. By providing the recess 25d in the disc cartridge 1, the recording/reproducing mechanism provided on the recording and/or reproducing apparatus can be moved towards and away from the optical disc 2. By reducing the distance between the optical disc 2 and the recording/reproducing mechanism, it is possible to reduce the thickness of the recording and/or reproducing apparatus employing the disc cartridge 1.

The actuating portion 25c provided on the first shutter member 25 is formed as an elastic or resilient member, and is of a thickness thinner than the movement guide portion 25b. Similarly to the movement guide portion 25b, the actuating portion 25c is arranged within the shutter guide groove 20, with the distal end of the movement guide portion 25b protruding into the engagement groove 17 for the shutter opening/closing member, as shown in FIG. 4. At the distal end of the actuating portion 25c, exposed to the engagement groove 17 for the shutter opening/closing member, there is formed an actuating lug 28. The actuating portion 25c is pulled into the inside of the engagement groove 17 for the shutter opening/closing member, by the actuating lug 28 engaging with a shutter opening/closure member of the shutter actuating mechanism of the recording and/or reproducing apparatus moved within the engagement groove 17 so as to be thrust by the shutter opening/closure member in the direction indicated by arrow C1 in FIG. 4. Partway in the actuating portion 25c is bored a shutter retention opening 29. This shutter retention opening 29 is engaged by a lock pawl 30a of a lock member 30 which is arranged in a substantially triangular recess provided in a region between the upstanding peripheral wall 8 and the inner wall section 19 of the upper half cartridge 3 and which is rotationally supported by a supporting shaft 21. The opening/closure movement of the first shutter member 25 is controlled by the lock pawl 30a of the lock member 30 engaging in the shutter retention opening 29 of the actuating portion 25c.

Since the actuating portion 25c is formed by an elastic or resilient member, it is able to be moved smoothly, as it is deformed, in a path along the shutter guide groove 20 shaped by the combination of a straight line and a curve, as shown in FIG. 4.

The lock member 30 includes a lock pawl 30a, an unlock lever 30b, partially protruded from a through-hole 18 formed in the engagement groove 17 for the shutter opening/closing member and an elastic member 30c, such as a spring plate, which biases the lock member 30 in the direction indicated by arrow D in FIG. 4, that is in a direction of engaging the distal end of the lock pawl 30a in the shutter retention opening 29.

Similarly to the first shutter member 25, the second shutter member 26 is substantially formed to a sector-shape, from a synthetic resin or metal, to a size sufficient to close the driving opening 16, as shown in FIGS. 3 and 4. The second shutter member 26 is formed with a reinforcement 31 along which the guide protrusion 27 of the first shutter member 25 is abutted and moved. This reinforcement 31 increases the contact area with the first shutter member 25 to assure the opening/closing operation of the second shutter member 26. The second shutter member 26 is provided with an engagement pin 33 near an end thereof for engagement in an engagement opening 32 bored in the lower half cartridge 4. The second shutter member 26 is moved in the direction indicated by arrows B1 and B2 in FIG. 4, about the engagement pin 33 as the center, for opening/closing the driving opening 16.

The second shutter member 26 is rotationally biased in the direction indicated by arrow B2 in FIG. 4 by a torsion coil spring 34 arranged in the recess formed in the lower half cartridge 4, as shown in FIG. 4. The torsion coil spring 34 is made up of an annular coil portion 34a, engaged by the engagement pin 33 inserted into the engagement opening 32 so as to be protruded into the substantially triangular recess in the lower half cartridge 4, an elastic first arm 34b extended from the coil portion 34a, and a second arm 34c longer in length than the arm 34b. The distal end of the second arm 34c of the torsion coil spring 34 is secured to the lower half cartridge 4, while the first arm 34b compresses against a coil spring thrusting pin 36 inserted through a sector-shaped elongated opening 35 formed in the lower half cartridge 4 so as to be protruded into the substantially triangular recess in the lower half cartridge 4. The elongated opening 35 is formed in the lower half cartridge 4 in adjacency to the engagement pin 33 of the second shutter member 26.

Figure 6:
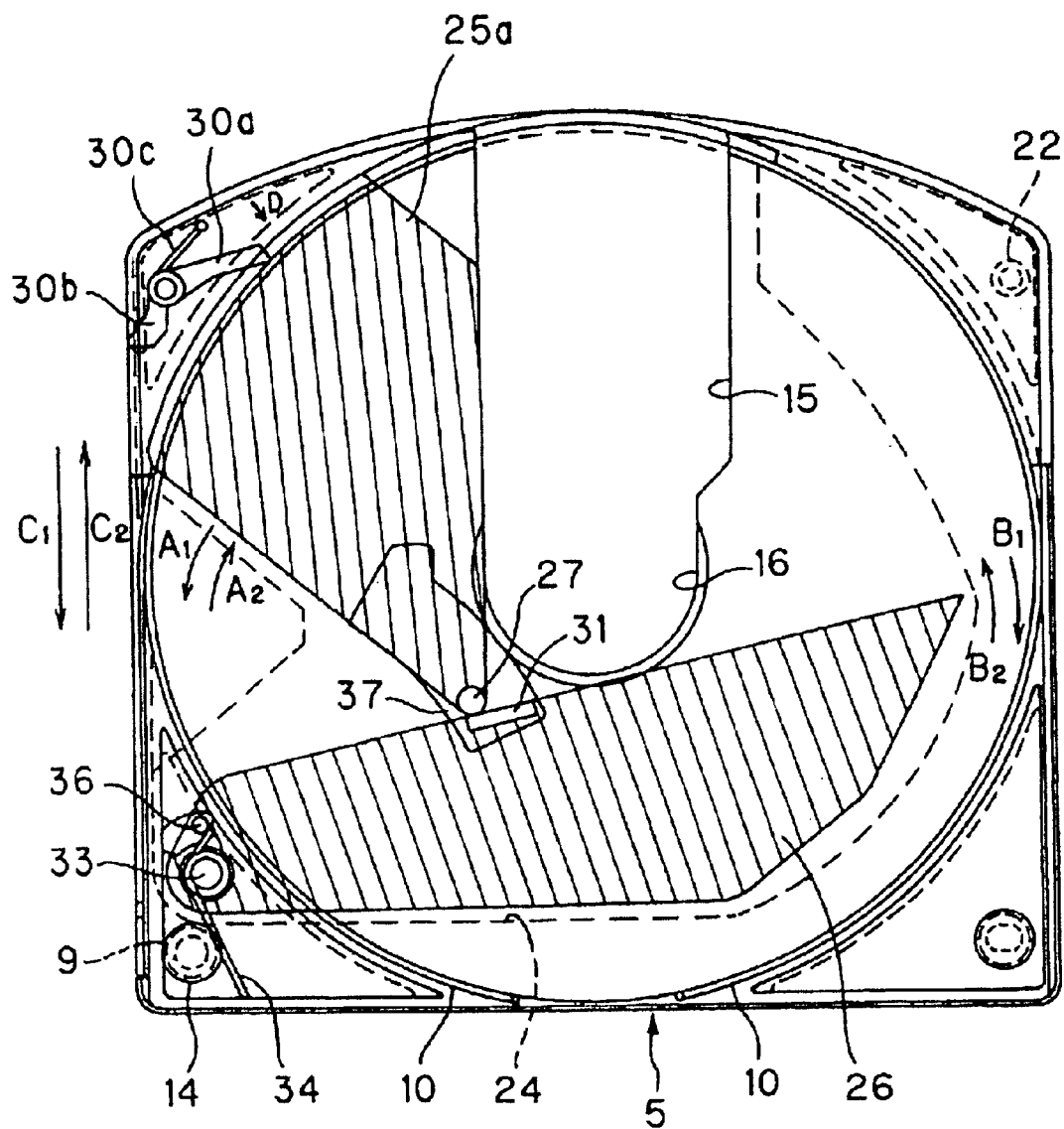
FIG. 6 is a plan view of the disc cartridge showing the opened state of the recording and/or reproducing opening and the driving opening.

In the event of the opening/closure operation by the first shutter member 25 and the second shutter member 26 of the shutter mechanism 23, as shown in FIGS. 4 and 6, the guide protrusion 27 formed on the surface of the shutter mechanism 23 and the reinforcement 31 are shifted. For this reason, the main cartridge body unit 5 is formed with a shutter guide opening 37 for extending over a range of shifting of the guide protrusion 27 and the reinforcement 31 of the lower half cartridge 4.

When the upper half cartridge 3 and the lower half cartridge 4 are abutted against and bonded to each other by thermal fusion or with an adhesive to form the main cartridge body unit 5, and the shutter mechanism 23 is arranged on the shutter mounting portion 24 provided on the main cartridge body unit 5, there is mounted a cover member 38 on the bottom side of the main cartridge body unit 5, that is on the side of the lower half cartridge 4 carrying the shutter mounting portion 24. The portion of the cover member 38 in register with the recording and/or reproducing opening 15 and the driving opening 16 is cut out, while there is formed an opening 39 at a position in register with the positioning portion 9 provided on the upper half cartridge 3 for exposing the opening end of the positioning portion 9 to outside. The cover member 38 holds the shutter mechanism 23 arranged on the shutter mounting portion 24 to prevent the intrusion of dust and dirt into the inside of the main cartridge body unit 5. The cover member 38 is secured, such as with an adhesive, to the main cartridge body unit 5. The disc cartridge 1 is formed in the lower half cartridge 4 with the recording and/or reproducing opening 15 and the driving opening 16, as first openings, and with a cut-out in the cover member 38, as a second opening, to provide the openings operative to expose the center opening 6 of the recording region of the optical disc 2 to outside.

Meanwhile, since the shutter member provided on the routine disc cartridge is mounted exteriorly of the main cartridge body unit, and is moved along the outer surface of the main cartridge body unit, the dust and dirt affixed to the outer surface of the main cartridge body unit is affixed to the back side of the shutter member to descend into the inside of the disc housing section.

In the disc cartridge 1 of the present invention, the first shutter member 25 and the second shutter member 26 are provided in the housing space defined between an inner wall constituted by the outer surface of the lower half cartridge 4 of the main cartridge body unit 5 and the cover member 38 arranged in an overlapping relation on the inner wall to constitute an outer wall, so that there is no risk that the dust and dirt affixed to the outer side of the main cartridge body unit 5 be intruded into the inside of the cartridge housing section 11 to assure reliable protection of the optical disc 2 housed in the main cartridge body unit 5.

The portion of the main cartridge body unit 5 where the first shutter member 25 and the second shutter member 26 are arranged constitutes the lower major surface of the main cartridge body unit 5, it is not possible to enlarge the space in which to hold the lower half cartridge 4 and the cover member 38, or else the main cartridge body unit 5 is increased in thickness. In the disc cartridge 1 according to the present invention, since the movement guide portion 25b is moved along the shutter guide groove 20 constituted between the inner wall section 19 of the upper half cartridge 3 and the peripheral wall 10 of the lower half cartridge 4 to cause rotation of the shutter portion 25a, there is no necessity for providing a supporting shaft at the center of rotation of the shutter portion 25a, so that the bottom of the main cartridge body unit 5 can be reduced in thickness even if the spacing in which to accommodate the shutter members 25, 26 is provided in the bottom of the main cartridge body unit 5, so that there is no fear of increasing the thickness of the main cartridge body unit 5.

Figure 7:
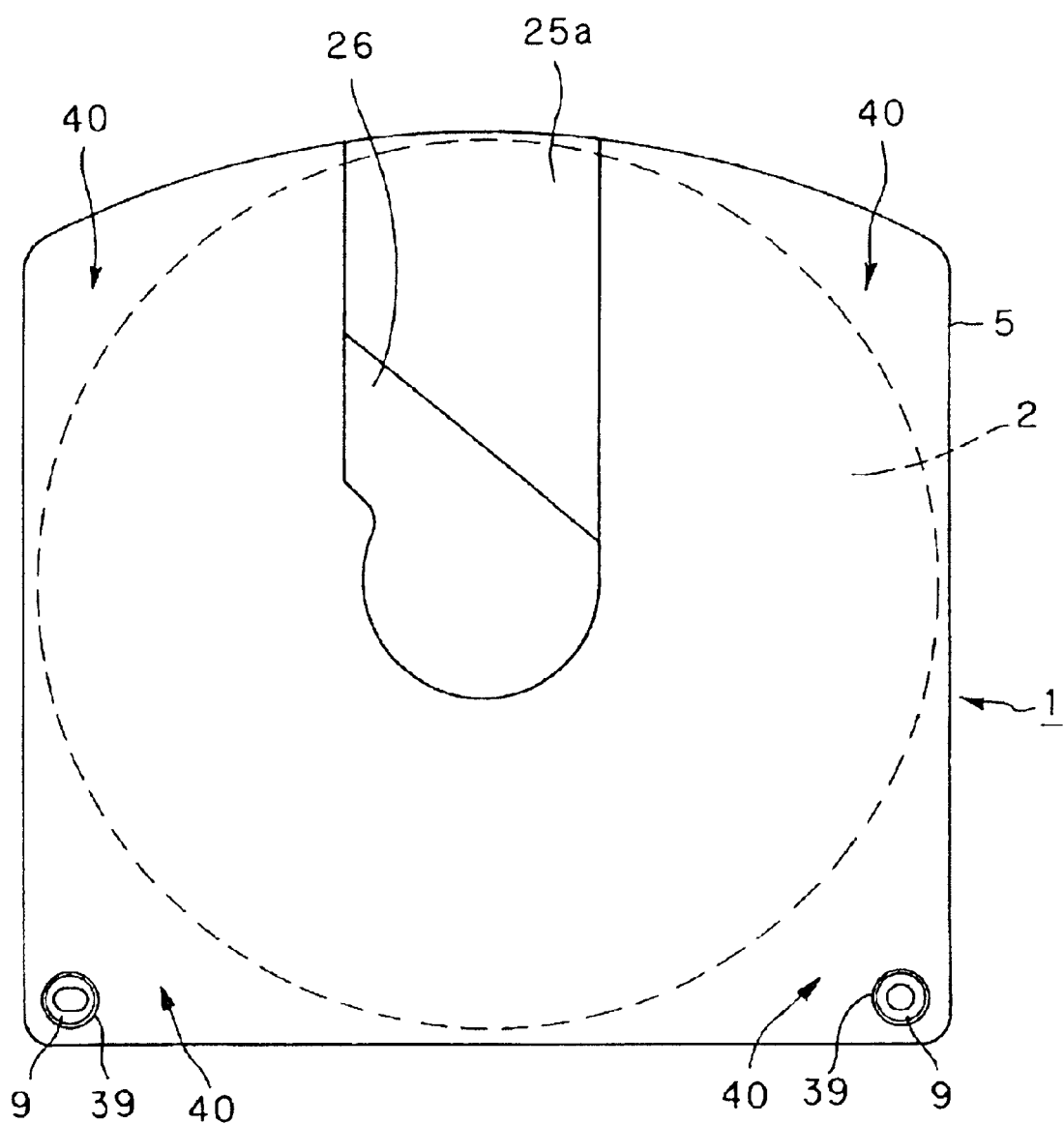
FIG. 7, similarly to FIG. 6, is a bottom view of a disc cartridge showing the closed state of the recording and/or reproducing opening and the driving opening.

In the disc cartridge 1 according to the present invention, there are provided cartridge supporting portions 40 outwardly of the shutter mounting portion 24, that is at the four corners of the main cartridge body unit 5 outside the range of movement of the shutter mechanism 23, as shown in FIG. 7. The cartridge supporting portions 40 are supported by positioning pins provided on the recording and/or reproducing apparatus for setting the positions in the height-wise direction and in the horizontal direction and height setting pins similarly provided on the recording and/or reproducing apparatus for setting the positions in the height-wise direction. The cartridge supporting portions 40 provided at the back side corners of the main cartridge body unit 5 are provided with positioning portions 9 engaged by the positioning pins, as described above, while the cartridge supporting portions 40 provided at the front side corners of the main cartridge body unit 5 are left as plain surfaces and are supported by the height setting pins. In particular, in the disc cartridge 1 according to the present invention, the front surface of the main cartridge body unit 5 operating as the inserting end into the recording and/or reproducing apparatus is formed as a continuous arcuate surface having a radius larger than that of the arc of the disc housing section 11 provided on the lower half cartridge 4, so that the region surrounded by the front surface section of the main cartridge body unit 5 and the disc housing section 11 can be increased in area. Thus, the cartridge supporting portions 40 of an increased area are supported by the height setting pins constituting the positioning supporting mechanism provided on the recording and/or reproducing apparatus, so that the disc cartridge can be reliably positioned and supported in a stabilized state by the height setting pins provided within the recording and/or reproducing apparatus.

Meanwhile, the disc cartridge 1 according to the present invention delimits a spacing in which to accommodate the shutter members 25, 26 in a section for the disc housing section 11 in which to accommodate the optical disc 2. For constituting this spacing, the portions of the lower half cartridge 4 and the cover member 38 are reduced in thickness. On the other hand, if the delimiting portions of the spacing for the shutter members 25, 26 are thrust and deformed, this spacing is reduced in area so that smooth movement of the shutter members 25, 26 is not guaranteed.

In the disc cartridge 1 of the present invention, there is left in the front side corners of the main cartridge body unit 5 a large-sized region which is not the disc housing section 11 nor a region for movement of the shutter members 25, 26, this region being used as the cartridge supporting portion 40. Therefore, if the shutter members 25, 26 are adapted for movement along the bottom of the main cartridge body unit 5, and there is provided a spacing in the bottom of the main cartridge body unit 5 for accommodating the shutter members 25, 26, the main cartridge body unit 5 can be supported with correct positioning along the height in a stabilized state by the height setting pins provided in the recording and/or reproducing apparatus, while smooth movement of the shutter members 25, 26 is assured.

Referring to the drawings, the operation of inserting the above-described disc cartridge 1 into the recording and/or reproducing apparatus and subsequently ejecting the disc cartridge 1 from the recording and/or reproducing apparatus is explained.

In the non-use state of the disc cartridge 1, that is in the storage state in which the disc cartridge is not loaded in position in the recording and/or reproducing apparatus, the first shutter member 25 is placed in a position of closing mainly the recording and/or reproducing opening 15, with the second shutter member 26 being at a position of closing mainly the driving opening 16, as shown in FIG. 4. With the present disc cartridge 1, since the second shutter member 26 is abutted against the first shutter member 25 inhibited as to the opening/closure operation by the lock pawl 30a of the lock member 30 engaging with the shutter retention opening 29, the shutter members 25, 26 cannot be moved unless this locking state is released. In the non-use state, the disc cartridge 1 closes the cut-out 3b formed in the front surface 3a by the movement guide portion 25b of the first shutter member 25, as shown in FIG. 2.

In the loaded state of the disc cartridge 1 in the recording and/or reproducing apparatus, the positioning pins for setting the positions in the horizontal direction and in the height-wise direction, constituting the positioning mechanism provided in the recording and/or reproducing apparatus, are engaged in the engagement holes provided in the positioning portions 9, while supporting the peripheral portions of the positioning portions 9. On the other hand, the height setting pins support the flat cartridge supporting portions 40, 40 provided on both corners on the front surface of the main cartridge body unit 5, so that the disc cartridge 1 is loaded with positioning in the horizontal direction and in the height-wise direction within the recording and/or reproducing apparatus.

When the disc cartridge 1 is inserted into the recording and/or reproducing apparatus, a shutter opening/closure member of the shutter actuating mechanism provided on the recording and/or reproducing apparatus is engaged in the engagement groove 17 for the shutter opening/closing member provided on one side of the main cartridge body unit 5, so that the unlock lever 30b of the lock member 30 protruded into the engagement groove 17 for the shutter opening/closing member is thrust in the direction indicated by arrow C1 in FIG. 4. Since the lock member 30 is rotationally supported by the supporting shaft 21, the distal end of the lock pawl 30a is rotated in the direction opposite to that indicated by arrow D in FIG. 4 when the unlock lever 30b is thrust in the direction indicated by arrow C1 in FIG. 4, so that the distal end of the lock pawl 30a is disengaged from the shutter retention opening 29. When the distal end of the lock pawl 30a is disengaged from the shutter retention opening 29, the first shutter member 25 is released from the state of retention.

When the disc cartridge 1 is inserted further into the recording and/or reproducing apparatus, the shutter opening/closure member is moved further in the direction indicated by arrow C1 in FIG. 4 in the engagement groove 17 for the shutter opening/closing member, until the shutter opening/closure member is engaged with the actuating lug 28 provided on the actuating portion 25c of the first shutter member 25. When the actuating lug 28 is engaged in the shutter opening/closure member, the actuating portion 25c is pulled into the engagement groove 17 for the shutter opening/closing member. If, as shown in FIG. 4, the actuating portion 25c is pulled into the engagement groove 17 for the shutter opening/closing member, the first shutter member 25 is rotated to open the recording and/or reproducing opening 15, as shown in FIGS. 6 and 8. If, in the disc cartridge 1, the recording and/or reproducing opening 15 is opened, as shown in FIG. 8, the recess 15d provided in the movement guide portion 25b is positioned in the cut-out 3b into which is intruded the recording/reproducing mechanism, such as an optical pickup, provided on the recording and/or reproducing apparatus, for opening the front surface of the main cartridge body unit 5. The recording/reproducing mechanism of the recording and/or reproducing apparatus can be approached and intruded into the disc cartridge by opening the cut-out 3b.

If the first shutter member 25 is rotated in the direction of opening the recording and/or reproducing opening 15, the second shutter member 26 is rotated about the engagement pin 33 as center, in the direction indicated by arrow B1 in FIG. 6, against the bias of the torsion coil spring 34, by the guide protrusion 27 whose position is changed with rotation of the first shutter member 25. When rotated to the position regulating the rotation of the first shutter member 25, the second shutter member 26 opens the driving opening 16, as shown in FIGS. 6 and 8.

When the disc cartridge 1 is introduced into the inside of the recording and/or reproducing apparatus until the recording and/or reproducing opening 15 and the driving opening 16 are opened, the disc cartridge 1 is positioned and supported by the positioning mechanism, as described above, and is loaded on the disc table of the rotational driving mechanism. If the rotational driving mechanism is run in operation for rotationally driving the optical disc 2 and for driving the recording/reproducing mechanism, such as an optical pickup, information signals are recorded on the optical disc, or the information signals recorded on the optical disc are reproduced.

If, after end of recording of information signals on the optical disc 2, or end of reproduction of information signals recorded on the optical disc, the disc cartridge 1 is to be ejected from the recording and/or reproducing apparatus, an ejection mechanism is actuated for shifting the shutter opening/closure member of the shutter actuating mechanism in the direction indicated by arrow C2 in FIG. 6. This thrusts the actuating lug 28 by the shutter opening/closure member to move the actuating lug 28 in the same direction to rotate the first shutter member 25 in the direction indicated by arrow A2 in FIG. 6 for closing the recording/reproducing opening 15. If the first shutter member 25 is rotated in the direction of closing the opening 15, the second shutter member 26 also is rotated, under the bias of the torsion coil spring 34, in the direction indicated by arrow B2 in FIG. 6, to close the driving opening 16.

When the first shutter member 25 is restored to the initial position shown in FIG. 4, the lock pawl 30a of the lock member 30 is again engaged in the shutter retention opening 29 formed in the actuating portion 25c so as to be held in the position of closing the recording and/or reproducing opening 15 as indicated in FIGS. 2 and 4. If the first shutter member 25 is rotated to the position of closing the opening 15, the second shutter member 26 abutted against the first shutter member 25 also is retained against the bias of the torsion coil spring 34 to close the recording and/or reproducing opening 15 and the driving opening 16.

Meanwhile, the shutter mechanism 23 provided in the disc cartridge 1 according to the present invention is configured for opening/closing the recording and/or reproducing opening 15 and the driving opening 16 by the first and second shutter members 25, 26. The first and second shutter members 25, 26 are configured for being overlapped with each other to preclude a gap otherwise produced in the abutting portion when the first and second shutter members 25, 26 have been rotated to the position of closing the opening 15 and the driving opening 16. In the illustrated embodiment, a step 25a is provided on one side of the first shutter member 25, as shown in FIG. 8, so that, when the first and second shutter members 25, 26 have been rotated to the position of closing the openings 15, 16, the second shutter member 26 is partially overlapped on a step 25a to close the openings 15, 16 completely, as shown in FIG. 2. Since the openings 15, 16 are closed as the first and second shutter members 25, 26 are partially overlapped with each other, it is possible to prevent dust and dirt from entering the inside of the main cartridge body unit 5 via the abutting portions of the first and second shutter members 25, 26.

Since the recording and/or reproducing opening 15 and the driving opening 16 in the present disc cartridge 1 are opened and closed by the first and second shutter members 25, 26 which are split and are rotated along the bottom side major surface of the main cartridge body unit 5, it is possible to constitute the openings 15, 16 with sizes larger than the size of the main cartridge body unit 5. That is, since the recording and/or reproducing opening 15 and the driving opening 16 can be larger in size than the openings provided on the conventional disc cartridge opened and closed by a shutter member movable along a lateral side of the main cartridge body portion, it is possible to use a recording medium of the recording and/or reproducing apparatus having a large-sized optical pickup device having plural object lenses.

Moreover, since the recording and/or reproducing opening 15 and the driving opening 16 are provided for extending along the direction of insertion of the disc cartridge 1 into the recording and/or reproducing apparatus, the disc cartridge can be easily loaded on the recording and/or reproducing apparatus in which the rotational driving mechanism and recording and/or reproducing means, such as an optical pickup device, are arranged in tandem, for extending along the disc cartridge inserting direction.

Also, with the disc cartridge 1 of the present invention, the first and second shutter members 25, 26 are opened/closed in unison by the actuating portion 25c being actuated in the direction of being inserted into and detached from the recording and/or reproducing apparatus. Thus, with the recording and/or reproducing apparatus, it is only sufficient if a bar-shaped pin, for example, is provided in a direction towards the entrance/exit opening, as a shutter opening/closure member adapted for opening the shutter mechanism 23 of the disc cartridge 1, thus simplifying the loading mechanism for the disc cartridge 1.

Since the shutter mechanism 23 in the disc cartridge 1 of the present invention is opened or closed by the actuating portion 25c provided for extending along the lateral side of the main cartridge body unit 5, there is no limitation imposed on the shape of the front side of the main cartridge body unit 5 by the shutter mechanism 23. Although the front side of the main cartridge body unit 5 is arcuate in the above description, the front side of the main cartridge body unit 5 may be shaped freely insofar as it is not collided against the optical disc 2 housed therein.

In the disc cartridge 1 according to the present invention, the shutter portion 25a, movement guide portion 25b and the actuating portion 25c of the first shutter member 25 may be formed as one from the same material, or from different materials, and subsequently combined together. That is, the shutter portion 25a, movement guide portion 25b and the actuating portion 25c of the first shutter member 25 may be formed of suitable materials depending on the physical properties, such as resiliency or durability required of these components.

Although the recording and/or reproducing opening 15 and the driving opening 16 are formed in the lower half cartridge 4, it is also possible to form similar openings in the upper half cartridge 3 and to provide the upper half cartridge 3 with the shutter mechanism 23.

A modification of the disc cartridge according to the present invention is now explained.

Figure 9:
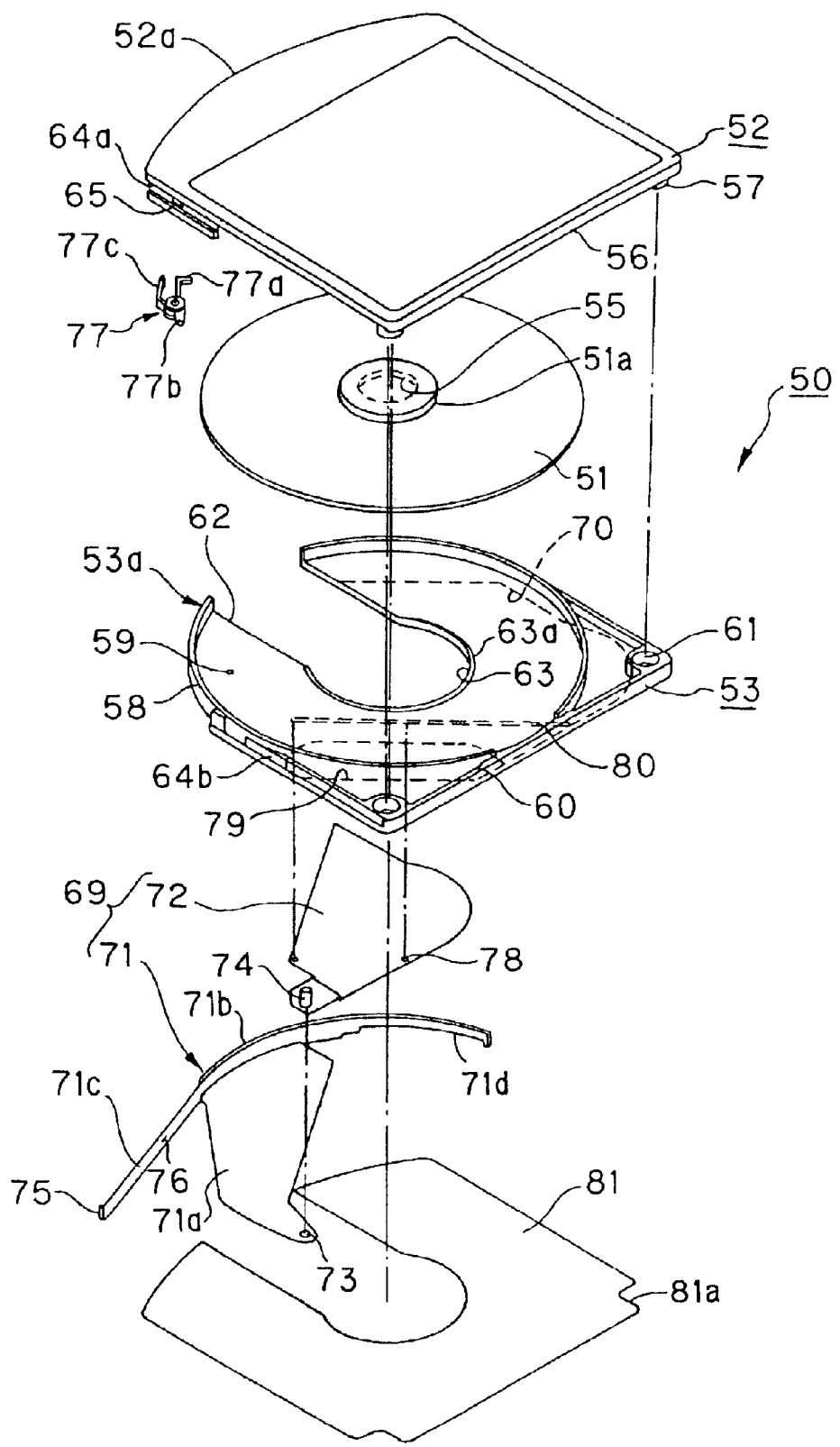
FIG. 9 is an exploded perspective view showing a modification of the disc cartridge according to the present invention.

Referring to FIG. 9, a disc cartridge 50 houses an optical disc 51 for rotation in a main cartridge body unit 54 constituted by an upper half cartridge 52 and a lower half cartridge 53.

The optical disc 51, housed in the main cartridge body unit 54, has a center opening 55 and a hub 51a formed of a magnetic material, such as a metal plate, for closing the center opening 55. The optical disc 51 is set on a disc table of a rotational driving mechanism of the recording and/or reproducing apparatus and has a hub 51a attracted by a magnet provided on the disc table so that the optical disc 51 will be rotated in unison with the disc table. When the optical disc 55 is loaded on the disc table, a centering portion provided at the center of the disc table is engaged with the center opening 55 to achieve centering in which the center of rotation of the optical disc 51 is coincident with the center of rotation of the disc table.

The main cartridge body unit 54, rotationally housing the optical disc 51, is combined from an upper half cartridge 52 and a lower half cartridge 53 abutted and connected to each other. The upper half cartridge 3 and the lower half cartridge 4 are substantially rectangular in shape and molded from synthetic resin, as shown in FIG. 9.

The upper half cartridge 52, constituting the main cartridge body unit 54, has an upstanding peripheral wall 8 constituting a peripheral wall of the main cartridge body unit 54. The upper half cartridge 52 has a front surface 52a, as an inserting end of the upper halfcartridge 52 into the recording and/or reproducing apparatus, presents a continuous arcuate surface. The front surface 52a of the upper half cartridge 52 also operates as a front surface of the main cartridge body unit 54. The opposite lateral surfaces of the main cartridge body unit 54 perpendicular to the front surface 52a of the upper half cartridge 52 operating as the inserting end into the recording and/or reproducing apparatus are formed as flat surfaces to permit the inserting end into the recording and/or reproducing apparatus to be recognized as such. The disc cartridge can also be distinguished from the rectangular disc cartridge, having flat lateral sides, widely recognized as the disc cartridge.

Since only the front surface 52a of the upper half cartridge 52 constituting the front surface of the main cartridge body unit 54 is formed as an arcuate surface, while the lateral surfaces thereof perpendicular to the front surface 52a are linear flat surfaces parallel to each other, these lateral surfacers act as inserting guide surfaces at the time of insertion and detachment with respect to the recording and/or reproducing apparatus to realize stable lateral surfaces of the recording and/or reproducing apparatus.

With the disc cartridge 50, only the front surface 52a thereof operating as an inserting end into the recording and/or reproducing apparatus is designed as an arcuate surface, the disc cartridge 50 can be reduced in plan size as compared to the optical disc 52 housed therein to permit reduction in size of the recording and/or reproducing apparatus employing the disc cartridge 50.

The corners on the back side opposite to the arcuately-shaped front surface 52a of the upper half cartridge 52 are formed with tubular positioning portions 57 engaged by positioning pins constituting positioning means provided on the recording and/or reproducing apparatus. Each of the positioning portions 57 has its distal end opened and has its proximal end closed by the upper half cartridge 52.

The lower half cartridge 53, abutted against the upper half cartridge 52 to constitute the main cartridge body unit 54, is arcuate with a radius smaller than that of the front surface 53a of the upper half cartridge 52. That is, an arcuate front surface 53a of the lower half cartridge 53 is arcuate with a radius smaller than that of the front surface 52a of the upper half cartridge 52, as shown in FIG. 9. The portions of the lower half cartridge 53 other than the front surface 53a are shaped similarly to the upper half cartridge 52. That is, the opposite lateral sides perpendicular to the front surface 53a of the lower half cartridge 53 is arcuate with a radius smaller than that of the front surface 53a of the lower half cartridge 53, as shown in FIG. 9. The portions of the lower half cartridge 53 other than the front surface 53a are shaped similarly to the upper half cartridge 52. That is, the opposite lateral sides perpendicular to the front surface 53a of the lower half cartridge 53 are parallel to each other, with the back surface opposite to the front surface 53a being formed as planar surfaces.

On the inner major surface of the lower half cartridge 53 is formed upright an arcuate housing section forming wall 58 constituting a circular disc housing section 59. This housing section forming wall 58 has the same radius of curvature as that of the front surface 53a. On the outer perimeter of the lower half cartridge 53 is formed an upstanding peripheral wall 60 abutted against the upstanding peripheral wall 56 constituting the peripheral wall of the main cartridge body unit 54 formed upright on the outer rim of the upper half cartridge 52. In substantially triangular regions of the back surface side of the lower half cartridge 53 surrounded by the upstanding peripheral wall 60 and the housing section forming wall 58, there are formed holes 61 into which are fitted the positioning portions 57 provided on the upper half cartridge 52.

Referring to FIG. 9, the lower halfcartridge 53 is formed with a recording and/or reproducing opening 62 and a driving opening 63. The recording and/or reproducing opening 62 is adapted for exposing a portion of the signal recording region of the optical disc 51 housed in the disc housing section 59 to outside across the inner and outer rims of the disc, and for facing recording and/or reproducing means, such as an optical pickup device, while the driving opening 63 is adapted to permit entrance of a turntable of the rotational driving mechanism provided on the recording and/or reproducing apparatus. In the present disc cartridge 50, the recording and/or reproducing opening 62 is formed in continuation with the driving opening 63.

Referring to FIG. 9, the recording and/or reproducing opening 62 is formed substantially as a rectangular opening extending from the vicinity of the mid portion of the disc housing section 59 up to the front surface 53a of the lower half cartridge 53. This opening 52, continuing to the driving opening 63, is formed by opening the front surface 53a of the lower half cartridge 53. The driving opening 63 is substantially circular and is positioned at a mid portion of the disc housing section 59. On the periphery of the inner rim of the driving opening 63 is formed a disc supporting portion 63a supporting the rim of the center opening 55 of the optical disc 51 housed in the disc housing section 59.

Figure 10:
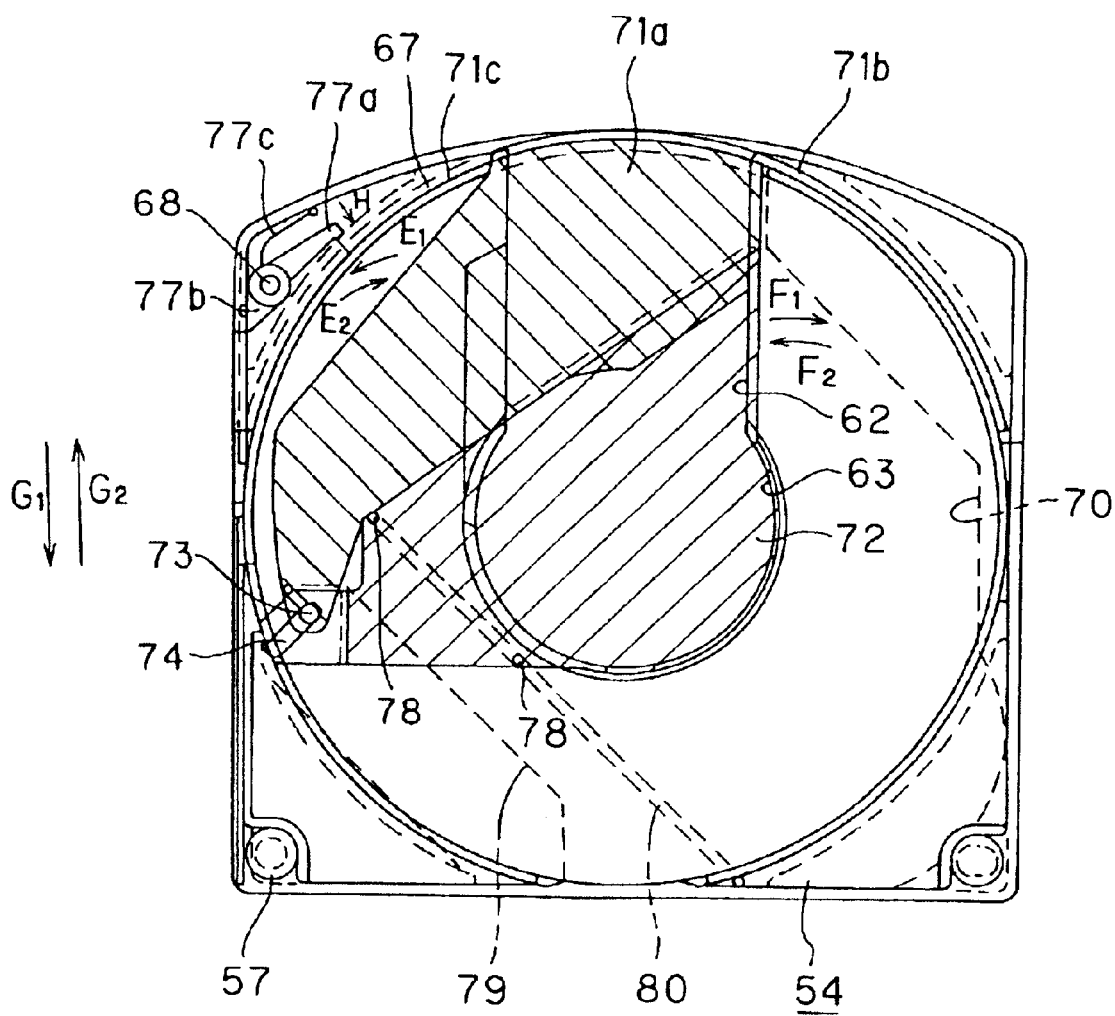
FIG. 10 is a plan view of the disc cartridge showing the state in which the recording and/or reproducing opening and the driving opening are closed.

In the main cartridge body unit 54, since the front surface 53a of the lower half cartridge 53 has a curvature larger than the curvature of the front surface 52a of the lower half cartridge 52, the corners of the front surface of the upper half cartridge 52 are protruded from the corners on the upper half cartridge 52 when the upper and lower half cartridges 52, 53 are abutted against each other, as shown in FIG. 10. The upstanding peripheral wall 56, formed on the portion of the upper half cartridge 52 protruded from the lower half cartridge 53, is formed to a height corresponding to the thickness of the main cartridge body unit 54.

In a lateral surface perpendicular to the front surface of the main cartridge body unit 54 is formed an engagement groove 64 for a shutter opening/closing member. When the upper and lower half cartridges 52, 53 are abutted against each other, the engagement groove 64 for a shutter opening/closing member is abutted against a groove 64a formed in the upstanding peripheral wall 56 of the upper half cartridge 52 and against a recess 64b formed in the upstanding peripheral wall 60 on the lower half cartridge 53. When the disc cartridge 50 is inserted into the recording and/or reproducing apparatus, a shutter opening/closing member constituting the shutter opening/closing mechanism provided on the recording and/or reproducing apparatus is engaged in the engagement groove 64 for a shutter opening/closing member for movement therein. The engagement groove 64 for a shutter opening/closing member is formed with a through-hole 65 into which is protruded part of a lock member 77 as later explained.

Figure 11:
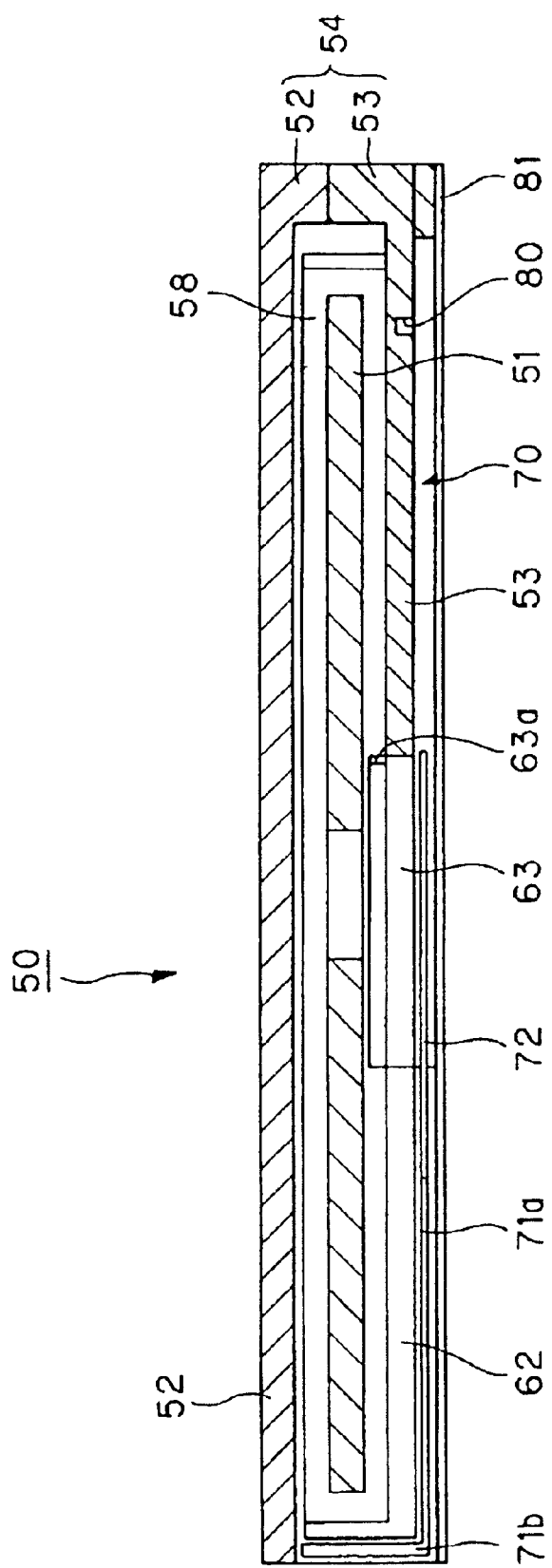
FIG. 11 is a longitudinal cross-sectional of the disc cartridge.

The front surface 52a of the upper half cartridge 52 constituting the main cartridge body unit 54 is formed with an inner wall 66 having the same curvature as that of the front surface 53a of the lower half cartridge 53. When the upper and lower half cartridges 52, 53 are abutted against each other, as shown in FIGS. 10 and 11, the inner wall section 66 is abutted against the inner surface of the lower half cartridge 53 along the outer periphery of the arcuate housing section forming wall 58 provided on the lower half cartridge 53. In the inner wall section 66 of the upper half cartridge 52 and in housing section forming wall 58 of the lower half cartridge 53 is formed a shutter guide groove 67 for guiding the opening/closure movement of a first shutter member 71 of the shutter mechanism 69, as shown in FIGS. 10 and 11.

At both corners towards the front surface of the main cartridge body unit 54 are formed a pair of substantially triangular regions surrounded by the upstanding peripheral wall 56 and the inner wall section 66 of the upper half cartridge 52, as shown in FIG. 10. In a region of the main cartridge body unit 54 provided with the engagement groove 64 for a shutter opening/closing member provided in the main cartridge body unit 54, there is protruded a supporting shaft 68 for rotationally supporting the lock member 77, as shown in FIG. 10.

In the bottom surface of the lower half cartridge 53 constituting the main cartridge body unit 54, there is provided a recessed shutter mounting portion 70 in which to mount the shutter mechanism 69 adapted for opening/closing the recording and/or reproducing opening 62 and the driving opening 63. The shutter mounting portion 70 is formed over an extent through which is slid the shutter mechanism 69 for opening/closing the recording and/or reproducing opening 62 and the driving opening 63.

The shutter mechanism 69 arranged on the shutter mounting portion 70 is made up of a first shutter member 71 for opening/closing the recording and/or reproducing opening 62 and a second shutter member 72 for opening/closing the driving opening 63. The first shutter member 71 and the second shutter member 72 are arranged with an overlap at the ends operating as the center of rotation, with other portions of the first and second shutter members 71, 72 being arranged on the co-planar plane in the shutter mounting portion 70.

The first shutter member 71 is formed of synthetic resin or metal and is made up of a shutter portion 71a, formed as a flat plate, a movement guide portion 71b formed upright on a side of the shutter portion 71a, and an actuating portion 71c protruded from one end of the movement guide portion 71b, as shown in FIG. 9. The first shutter member 71 is mounted on the main cartridge body unit 54, with the shutter portion shutter portion 71a being positioned in the shutter mounting portion 70 formed in the lower half cartridge 53 and with the movement guide portion 71b and the actuating portion 71c being positioned in the shutter guide groove 67. The shutter portion shutter portion 71a is formed as substantially trapezoidal shape of a size sufficient to close the recording and/or reproducing opening 62, and carries on its lateral side an arcuate portion of the same curvature as that of the front surface 53a of the lower half cartridge 53. This shutter portion shutter portion 71a is rotated in the direction indicated by arrows Engagement groove 17 for a shutter opening/closing member and E2 in FIG. 10 with the center of the disc housing section 59 as virtual center, for opening/closing the recording and/or reproducing opening 62. The shutter portion 71a is abutted against the second shutter member 72 along the arcuate-shaped lateral surface.

The movement guide portion 71b is formed subsequently upright with respect to the shutter portion shutter portion 71a for extending along an arcuate portion formed on one side of the shutter portion shutter portion 71a. This movement guide portion 71b is formed in an arcuate shape of the same radius of curvature as that of the shutter guide groove 67 and is arranged for movement therein in the direction indicated by arrows Engagement groove 17 for a shutter opening/closing member and E2 in FIG. 10. The movement guide portion 71b is of a length longer than the arcuate portion of the shutter portion shutter portion 71a to reach the vicinity of an end of a shutter guide groove 67 to control the movement of the first shutter member 71 so that the latter will not be moved in excess of a pre-set distance in the direction indicated by arrow E2 in FIG. 10. The movement guide portion 71b is provided with a recess 71d into which is intruded the recording/reproducing mechanism, such as an optical pickup, when the shutter mechanism 69 is opened.

In the closure position of the shutter mechanism 69, the movement guide portion 71b closes the cut-out 3b formed in the front side of the main cartridge body unit 54. When the shutter mechanism 69 is opened, the recess 71d is moved to the cut-out 3b to create an opening in the front side which will permit the optical disc 51 to be exposed to outside. By providing the recess 71d in the disc cartridge 50, the recording/reproducing mechanism provided on the recording and/or reproducing apparatus can be moved towards the optical disc 51. By reducing the distance between the optical disc 51 and the recording/reproducing mechanism in this manner, it is possible to reduce the thickness of the recording and/or reproducing apparatus.

The actuating portion 71c provided on the first shutter member 71 is formed as an elastic or resilient member, and is of a thickness thinner than the movement guide portion 71b. Similarly to the movement guide portion 71b, the actuating portion 71c is arranged within the shutter guide groove 67, with the distal end of the movement guide portion protruding into the engagement groove 64 for a shutter opening/closing member, as shown in FIG. 10. At the distal end of the actuating portion 71c, exposed to the engagement groove 64 for a shutter opening/closing member, there is formed an actuating lug 75. The actuating portion 71c is pulled into the inside of the engagement groove 64 for a shutter opening/closing member, by the actuating lug 75 engaging with shutter opening/closure member of the shutter actuating mechanism provided on the recording and/or reproducing apparatus so as to be thrust by the shutter opening/closure member in the direction indicated by arrow G1 in FIG. 10, with the actuating lug 75 being then moved within the engagement groove 64 for a shutter opening/closing member. Partway in the actuating portion 71c is bored a shutter retention opening 76. This shutter retention opening 76 is engaged by a lock pawl 77a of the lock member 77 which is arranged in a substantially triangular recess provided in a region between the upstanding peripheral wall 56 and the inner wall section 66 of the upper half cartridge 52 and which is rotationally supported by a supporting shaft 68. The opening/closure movement of the first shutter member 71 is controlled by the lock pawl 77a of the lock member 77 engaging in the shutter retention opening 76 of the actuating portion 71c.

The lock member 77 includes a lock pawl 77a, an unlock lever 77b, partially protruded from a through-hole 65 formed in the engagement groove 64 for the shutter opening/closing member, and an elastic member 77c, such as a spring plate, which biases the lock member 77 in the direction indicated by arrow H in FIG. 10, that is in a direction of engaging the distal end of the lock pawl 77a in the shutter retention opening 76.

The second shutter member 72 is formed of, for example, synthetic resin or metallic material, and is of a width sufficient to close the driving opening 63. The second shutter member 72 includes two pins 78 on its major surface that are fitted into an operating guide groove 80 for guiding the trajectory of the opening/closure movement to control the trajectory of the shutter opening/closure operation.

The shutter mechanism 69 is configured so that the first shutter member 71 and the second shutter member 72 are fitted in an elongated opening for rotation 74 provided in the second shutter member 72 so that the operation of one of the shutter members occurring in association with that of the other member for opening or closing the openings. Also, in the shutter mechanism 69, the portion of the second shutter member 72 formed with an opening for rotation 76 is stepped so that the thus, with the shutter mechanism 69, the stepped portion of the second shutter member 72 is placed within a sliding portion 79 in which the shutter mounting portion 70 is arranged as a recess.

When the upper half cartridge 52 and the lower half cartridge 53 are abutted against and bonded to each other by thermal fusion or with an adhesive to form the main cartridge body unit 54, and the shutter mechanism 69 is arranged on the shutter mounting portion 70 provided on the main cartridge body unit 54, there is mounted a cover member 81 on the bottom side of the main cartridge body unit 54, that is on the side of the lower half cartridge 53 carrying the shutter mounting portion 70. The portion of the cover member 81 in register with the recording and/or reproducing opening 62 and the driving opening 63 is cut out, while there is formed a cut-out 81a at a position in register with the positioning portion 57 provided on the upper half cartridge 52 for exposing the opening end of the positioning portion 57 to outside. The cover member 81 holds the shutter mechanism 69 arranged on the shutter mounting portion 70 to prevent the intrusion of dust and dirt into the inside of the main cartridge body unit 54. The cover member 81 is secured, such as with an adhesive, to the main cartridge body unit 54. The disc cartridge 50 is formed in the lower half cartridge 53 with the recording and/or reproducing opening 62 and the driving opening 63, as first openings, and with a cut-out in the cover member 81, as a second opening, to provide the openings operative to expose the center opening 55 of the recording region of the optical disc 51 to outside.

Meanwhile, since the shutter member provided on the routine disc cartridge is mounted exteriorly of the main cartridge body unit, and is moved along the outer surface of the main cartridge body unit, the dust and dirt affixed to the outer surface of the main cartridge body unit is affixed to the back side of the shutter member at the time of the shutter member to descend into the inside of the disc housing section.

In the disc cartridge 1 of the present invention, the first shutter member 71 and the second shutter member 72 are provided in the housing space defined between the inner wall constituted by the outer surface of the lower half cartridge 53 of the main cartridge body unit 54 and the cover member 81 arranged in an overlapping relation on the inner wall to constitute the outer wall, so that there is no risk that the dust and dirt affixed to the outer side of the main cartridge body unit 5 be intruded into the inside of the cartridge housing section 59. That is, the first and second shutter members 71, 72 are not moved along the outer sides of the main cartridge body unit 54 where dust and dirt are liable to be deposited, but are moved within the inside of the main cartridge body unit 54, so that dust and dirt affixed to the outer surface of the main cartridge body unit 54 are positively prevented from entering the inside of the cartridge housing section 59 to assure reliable protection of the optical disc 51 housed in the main cartridge body unit 54.

Figure 13:
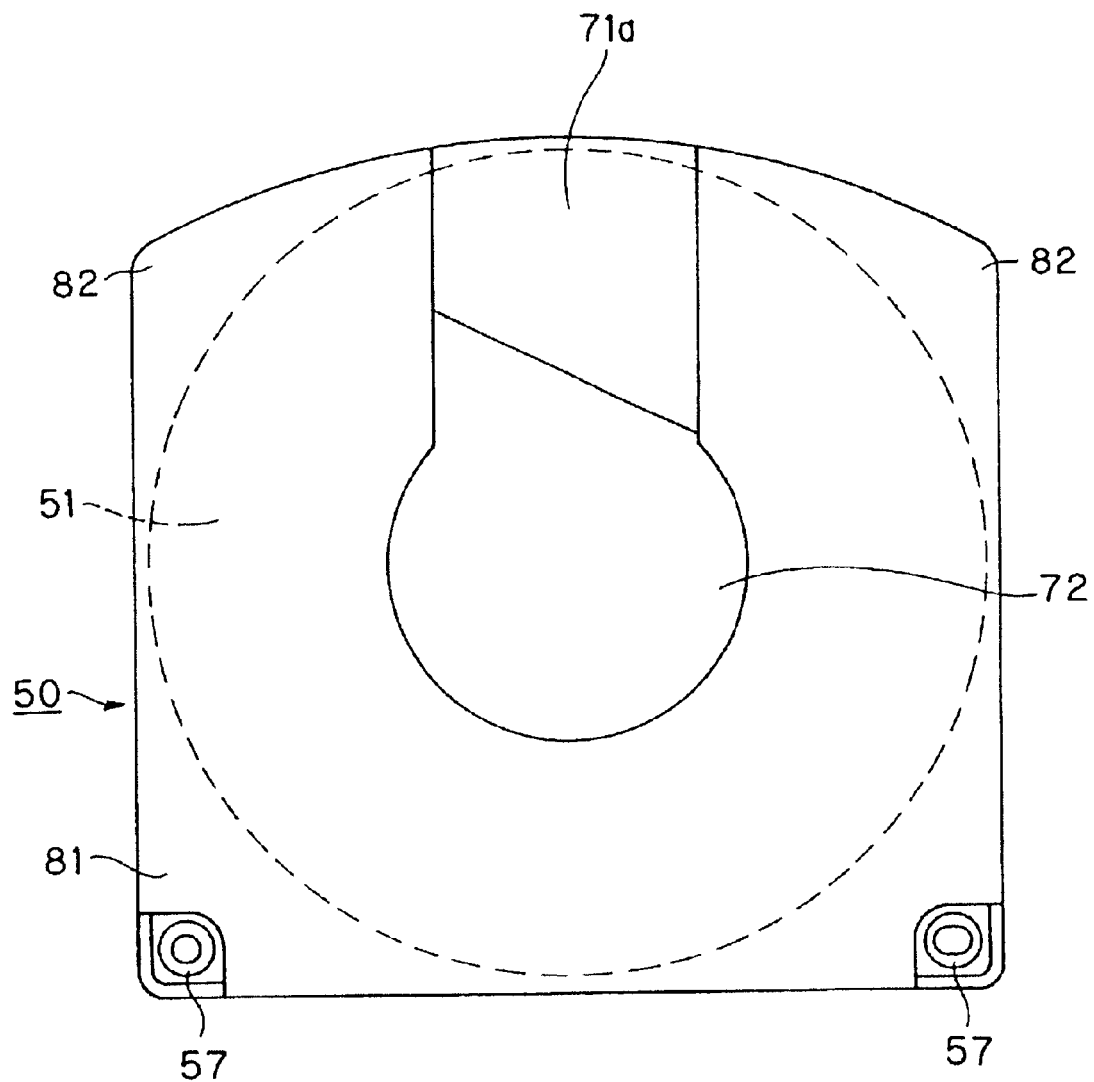
FIG. 13 is a bottom view of the disc cartridge showing the state in which the recording and/or reproducing opening and the driving opening are closed.

In the disc cartridge 50 of the present invention, a cartridge supporting portion 82 supported by a positioning pin constituting a positioning mechanism provided on the recording and/or reproducing apparatus for setting the position along the height and in the horizontal direction and by a height setting pin setting the position in the height-wise direction is provided at each of four corners of the main cartridge body unit 54 outwardly of the shutter mounting portion 70, that is outside the range of movement of the shutter mechanism 69, as shown in FIG. 13. The cartridge supporting portions 82, provided on the back side corners of the main cartridge body unit 54, are provided with positioning portions 57 engaged by the positioning pins, while the cartridge supporting portions 82 provided at the front side corners of the main cartridge body unit 54 are left as plain surfaces and are supported by the height setting pins. In particular, in the disc cartridge 50 according to the present invention, the front surface of the main cartridge body unit 54 operating as the inserting end into the recording and/or reproducing apparatus is formed as a continuous arcuate surface having a radius larger than the arc of the arc of the disc housing section 59 provided on the lower half cartridge 4, so that the region surrounded by the front surface section of the main cartridge body unit 54 and the disc housing section 59 can be increased in area. Thus, the cartridge supporting portions 82 of an increased area are supported by the height setting pins constituting the positioning supporting mechanism provided on the recording and/or reproducing apparatus, so that the disc cartridge can be reliably positioned and supported in a stabilized state by the height setting pins provided within the recording and/or reproducing apparatus.

In the disc cartridge 50 of the present invention, there is left in the front side corners of the main cartridge body unit 54 a large-sized region which is not the disc housing section 59 nor a region for movement of the shutter members 71, 72, this region being used as the cartridge supporting portion 82. Therefore, if the shutter members 71, 72 are adapted for movement along the bottom of the main cartridge body unit 54, and there is provided a spacing in the bottom of the main cartridge body unit 54 for accommodating the shutter members 71, 72, the main cartridge body unit 54 can be supported with correct positioning along the height in a stabilized state by the height setting pins provided in the recording and/or reproducing apparatus while smooth movement of the shutter members 71, 72 is assured.

Referring to the drawings, the operation of inserting the above-described disc cartridge 50 into the recording and/or reproducing apparatus and subsequently ejecting the disc cartridge 50 from the recording and/or reproducing apparatus is explained.

In the non-use state of the disc cartridge 50, that is in the storage state in which the disc cartridge is not loaded in position in the recording and/or reproducing apparatus, the first shutter member 71 is placed in a position of closing mainly the recording and/or reproducing opening 62, with the second shutter member 72 being at a position of closing mainly the driving opening 63, as shown in FIG. 10. With the present disc cartridge 50, since the second shutter member 72 is abutted against the first shutter members 71, inhibited from the opening/closure movement by the lock pawl 77a of the lock member 77 engaging with the shutter retention opening 76, the first and second shutter members 71, 72 are inhibited from movement unless this locked state is released.

When the disc cartridge 50 is loaded on the recording and/or reproducing apparatus, the positioning pins for setting the loading position in the horizontal direction and in the height-wise direction, constituting a positioning mechanism arranged in the recording and/or reproducing apparatus, are engaged in the engagement openings provided in the positioning portion 57, while supporting the peripheral portion of the positioning portion 57. In addition, the height setting pins support the flat cartridge supporting portions 82, 82 provided at both corners on the front side of the main cartridge body unit 54, whereby the disc cartridge 50 is loaded in position in the horizontal direction and in the height-wise direction in the recording and/or reproducing apparatus.

In the non-use state of the disc cartridge 50, that is in the storage state in which the disc cartridge is not loaded in position in the recording and/or reproducing apparatus, the first shutter member 71 is placed in a position of closing mainly the recording and/or reproducing opening 62, with the second shutter member 72 being at a position of closing mainly the driving opening 63, as shown in FIG. 10. With the present disc cartridge 50, the first and second shutter members 71, 72 are inhibited from movement unless a locked state is released. It is noted that the lock pawl 77a of the lock member 77 is engaged with the shutter retention opening 76 to inhibit the first shutter member 71 from performing an opening/closure movement.

When the disc cartridge 50 is inserted into the recording and/or reproducing apparatus, the positioning pins for setting the loading position in the horizontal direction and in the height-wise direction, constituting a positioning mechanism arranged in the recording and/or reproducing apparatus, are engaged in the engagement opening provided in the positioning portion 57, while supporting the peripheral portion of the positioning portion 57. In addition, the height setting pins support the flat cartridge supporting portions 82, 82 provided at both corners on the front side of the main cartridge body unit 54, whereby the disc cartridge 50 is loaded in position in the horizontal direction and in the height-wise direction in the recording and/or reproducing apparatus.

The shutter opening/closure member of the shutter actuating mechanism provided on the recording and/or reproducing apparatus is engaged in the engagement groove 64 for a shutter opening/closing member provided on one side of the main cartridge body unit 54, so that the unlock lever 77b of the lock member 77 protruded into the engagement groove 64 for a shutter opening/closing member is thrust in the direction indicated by arrow G1 in FIG. 10. Since the lock member 77 is rotationally supported by the supporting shaft 68, the distal end of the lock pawl 77a is rotated in the direction opposite to that indicated by arrow H in FIG. 7, when the unlock lever 77b is thrust in the direction indicated by arrow G1 in FIG. 10, so that the distal end of the lock pawl 77a is disengaged from the shutter retention opening 76. When the distal end of the lock pawl 30a is disengaged from the shutter retention opening 76, the first shutter member 71 is released from the state of retention.

When the disc cartridge 50 is inserted further into the recording and/or reproducing apparatus, the shutter opening/closure member is moved further in the direction indicated by arrow G1 in FIG. 10 in the engagement groove 64 for the shutter opening/closing member, until the shutter opening/closure member is engaged with the actuating lug 75 provided on the actuating portion 71c of the first shutter member 71 protruded into the engagement groove 64 for a shutter opening/closing member. When the actuating lug 75 is engaged in the shutter opening/closure member, the actuating portion 71c is pulled into the engagement groove 64 for the shutter opening/closing member. If, as shown in FIG. 12, the actuating portion 71c is pulled into the engagement groove 64 for a shutter opening/closing member, the shutter member shutter portion shutter portion 71a and the movement guide portion 71b are rotated to open the recording and/or reproducing opening 62, as shown in FIG. 12.

In the disc cartridge 50, the first shutter member 71 and the second shutter member 72 are rotated in the direction indicated by arrow F1 in FIG. 7, in association with the movement of the supporting shaft for rotation 73 fitted in the elongated opening for rotation 74 to open the driving opening 63.

If the disc cartridge 50 is inserted into the inside of the recording and/or reproducing apparatus up to a position of opening the recording and/or reproducing opening 62 and the driving opening 63, the disc cartridge 50 is loaded on the cartridge loading section within the recording and/or reproducing apparatus, as it is positioned and supported by the positioning mechanism, until the disc cartridge is loaded on the disc table of the rotational driving mechanism. The rotating driving mechanism then is driven for rotationally driving the optical disc 51, while the recording/reproducing mechanism, such as an optical pickup, is driven for recording information signals on the optical disc 51 or reproducing the information signals recorded on the optical disc 51.

Figure 12:
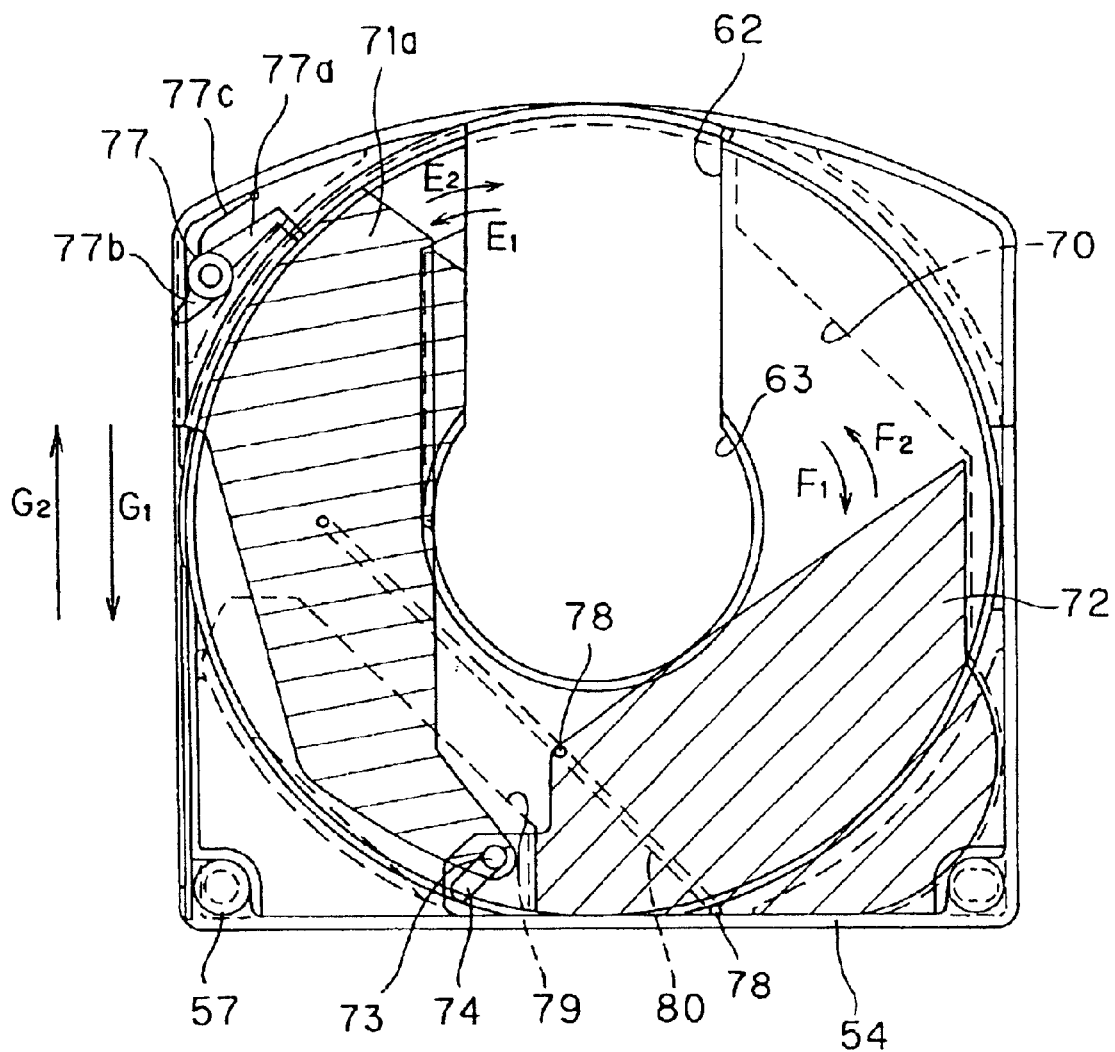
FIG. 12 is a longitudinal cross-sectional view of the disc cartridge in which the recording and/or reproducing opening and the driving opening are opened.

If, after the recording of the information signals on the optical disc 51, or after the end of reproduction of the information signals recorded on the optical disc 51, the disc cartridge 50 is to be ejected from the recording and/or reproducing apparatus, an ejection mechanism is actuated to cause movement of the shutter opening/closure member of the shutter actuating mechanism in the direction indicated by arrow G2 in FIG. 12. This causes the actuating lug 75 to be thrust by the shutter opening/closure member and moved in the same direction to cause rotation of the first shutter member 71 in the direction indicated by arrow E2 in FIG. 12 to close the opening 62. If the first shutter member 71 is rotated in the direction of closing the first shutter member 62, the second shutter member 72 also is pulled by the supporting shaft 73 fitted in the elongated opening for rotation 74 so as to be rotated in association with the operation of the supporting shaft 73 in the direction indicated by arrow F2 in FIG. 12 to close the driving opening 63.

When the first shutter member 71 is returned to the initial position shown in FIG. 10, the lock pawl 77a of the lock member 77 is again engaged in the shutter retention opening 76 formed in the actuating portion 71c so that the first shutter member 71 is held in the position of FIG. 10 to close the recording and/or reproducing opening 62. When the first shutter member 71 has been rotated to the position of closing the opening 62, the second shutter member 72, rotated in unison with the first shutter member 71, is also held in the position of closing the driving opening 63 to close both the recording and/or reproducing 62 and the driving opening 63.

What is claimed is:

1. A disc cartridge for housing a disc-shaped recording medium adapted for recording information signals thereon from a recording and/or reproducing apparatus, said disc-shaped recording medium being rotationally housed in a main cartridge body unit formed of an upper portion and a lower portion abutted and connected to each other, said disc cartridge comprising:

a recording and/or reproducing opening provided in said main cartridge body unit for exposing a signal recording region of said disc-shaped recording medium at least across the inner and outer rims of the disc-shaped recording medium;

a driving opening provided in said main cartridge unit for permitting intrusion of rotation driving means adapted for rotationally driving said disc-shaped recording medium; and a shutter mechanism including first and second shutter members for opening/closing said recording and/or reproducing opening, said first shutter member and said second shutter member being supported in a horizontally co-planar relationship within said main cartridge body unit, said first shutter member including a shutter portion for opening/closing said recording and/or reproducing opening, said first shutter portion having a side edge abutted against said second shutter member and an overlapping portion provided on the side edge for overlapping with a side of said second shutter member.

2. The disc cartridge of claim 1 wherein said overlapping portion overlapped the side of said second shutter member when the first and second shutter members have been moved to the position of closing said recording and/or reproducing opening and the driving opening.

3. The disc cartridge of claim 1 wherein the first shutter member is supported so that its one end will be moved along a position close to the outer periphery of a circular medium housing section formed on said main cartridge body unit for rotationally housing said disc-shaped recording medium therein; and wherein said second shutter member is supported by said main cartridge body unit by having its portion engaged and held by an engagement holding portion provided on said first shutter member, so that the second shutter member will be rotated in association with rotation of said first shutter member, said second shutter member being intimately contacted with a side of said first shutter member to close the recording and/or reproducing opening when the first shutter member has been moved to a first position of closing said recording and/or reproducing opening, said second shutter member being rotated with said first shutter member to a position opening said recording and/or reproducing opening when the first shutter member has been rotated.

4. The disc cartridge of claim 3 wherein an arcuate guide groove is formed for extending along the outer rim of the circular medium housing section, said guide groove being engaged by an arcuate upstanding section formed on one side of said first shutter member, said upstanding section being moved within said guide groove to cause rotation of said first shutter member.

5. The disc cartridge of claim 1 wherein said first shutter member includes a shutter portion for opening/closing the recording and/or reproducing opening and the driving opening, a movement causing portion for causing the movement of the shutter portion and a connecting portion interconnecting said shutter portion and said movement causing portion, said movement causing portion being moved along a side of said disc cartridge to cause movement of the shutter portion.

6. The disc cartridge of claim 5 wherein an arcuate guide groove is formed for extending along the outer peripheral surface of a said circular medium housing section, a linear guide groove being formed along a lateral side of said main cartridge body unit so as to be smoothly continuing to said arcuate guide groove;

an arcuate upstanding portion is positioned towards one side of said first shutter member, said upstanding portion being connected to said movement causing portion through said connecting portion;

said first shutter portion being supported by said main cartridge body unit so that the arcuate upstanding portion is moved in said arcuate guide groove, said movement causing portion is moved in said linear guide groove and said connecting portion is moved in said arcuate guide groove and in said linear guide groove.

7. The disc cartridge of claim 5 wherein said movement causing portion is flexible.

8. The disc cartridge of claim 5 and further comprising:

a lock mechanism inhibiting movement of the shutter portion of the first shutter member lying at a position of closing said recording and/or reproducing opening and the driving opening.

9. The disc cartridge of claim 8 and further comprising:

means for releasing the inhibition of movement of said shutter portion by said lock mechanism, said releasing means being provided on a lateral surface of said main cartridge body unit along which is moved said movement causing portion.

10. The disc cartridge of claim 9 wherein the means for releasing the inhibition of movement of said shutter portion by said lock mechanism is a first protrusion that appears and disappear on a lateral surface of said main cartridge body unit, said movement causing portion is a second protrusion moved along a lateral surface of said main cartridge body unit and wherein said first and second protrusions are positioned in a recessed groove formed along a lateral surface of said main cartridge body unit.

11. The disc cartridge of claim 10 wherein said first and second protusions are arranged in this order when looking from the disc cartridge inserting side into a recording and/or reproducing apparatus.

* * * * *